(12) United States Patent
Noureldin et al.

(10) Patent No.: US 11,118,483 B2
(45) Date of Patent: *Sep. 14, 2021

(54) NATURAL GAS LIQUID FRACTIONATION PLANT WASTE HEAT CONVERSION TO SIMULTANEOUS POWER, COOLING AND POTABLE WATER USING INTEGRATED MONO-REFRIGERANT TRIPLE CYCLE AND MODIFIED MULTI-EFFECT-DISTILLATION SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,124

(22) Filed: May 13, 2020

(65) Prior Publication Data

US 2020/0271020 A1    Aug. 27, 2020

Related U.S. Application Data

(63) Continuation of application No. 15/842,385, filed on Dec. 14, 2017, now Pat. No. 10,677,104.
(Continued)

(51) Int. Cl.
*F01K 27/02* (2006.01)
*F25J 3/02* (2006.01)
(Continued)

(52) U.S. Cl.
CPC ............ *F01K 27/02* (2013.01); *B01D 1/0058* (2013.01); *B01D 1/26* (2013.01); *B01D 3/065* (2013.01);
(Continued)

(58) Field of Classification Search
CPC ........ F25J 3/0209; F25J 3/0233; F25J 3/0238; F25J 3/0242; C10G 5/06; C10G 7/00;
(Continued)

(56) References Cited

U.S. PATENT DOCUMENTS

| 4,002,525 A | 1/1977 | Baierl et al. |
| 4,907,410 A | 3/1990 | Chang |

(Continued)

FOREIGN PATENT DOCUMENTS

| WO | 2006039182 | 4/2006 |
| WO | 2012003525 | 1/2012 |

(Continued)

OTHER PUBLICATIONS

GCC Examination Report in GCC Appln. No. GC 2018-35801, dated Apr. 28, 2020, 3 pages.
(Continued)

*Primary Examiner* — Brian A McCaig
(74) *Attorney, Agent, or Firm* — Fish & Richardson P.C.

(57) ABSTRACT

Certain aspects of natural gas liquid fractionation plant waste heat conversion to simultaneous power, cooling and potable water using integrated mono-refrigerant triple cycle and modified MED system can be implemented as a system that includes two heating fluid circuits thermally coupled to multiple heat sources of a NGL fractionation plant. An integrated triple cycle system, which includes an organic Rankine cycle (ORC), a refrigeration cycle and an ejector refrigeration cycle, is thermally coupled to the first heating fluid circuit. A MED system, configured to produce potable
(Continued)

water, thermally coupled to the second heating fluid circuit. The system includes a control system configured to actuate control valves to selectively thermally couple the heating fluid circuits to portions of the heat sources of the NGL fractionation plant.

20 Claims, 16 Drawing Sheets

Related U.S. Application Data

(60) Provisional application No. 62/542,687, filed on Aug. 8, 2017.

(51) Int. Cl.

| | | |
|---|---|---|
| *B01D 3/06* | (2006.01) | |
| *C10G 5/06* | (2006.01) | |
| *F01K 25/10* | (2006.01) | |
| *F01K 25/08* | (2006.01) | |
| *C02F 1/04* | (2006.01) | |
| *C10G 7/00* | (2006.01) | |
| *B01D 3/14* | (2006.01) | |
| *B01D 1/00* | (2006.01) | |
| *B01D 1/26* | (2006.01) | |
| *F01K 23/06* | (2006.01) | |
| *C02F 1/16* | (2006.01) | |
| *F25B 27/02* | (2006.01) | |
| *F28D 21/00* | (2006.01) | |
| *B01D 53/00* | (2006.01) | |
| *B01D 53/14* | (2006.01) | |
| *B01D 53/26* | (2006.01) | |
| *C02F 103/08* | (2006.01) | |

(52) U.S. Cl.
CPC ............... *B01D 3/146* (2013.01); *C02F 1/04* (2013.01); *C02F 1/16* (2013.01); *C10G 5/06* (2013.01); *C10G 7/00* (2013.01); *F01K 23/064* (2013.01); *F01K 25/08* (2013.01); *F01K 25/10* (2013.01); *F25B 27/02* (2013.01); *F25J 3/0209* (2013.01); *F25J 3/0233* (2013.01); *F25J 3/0238* (2013.01); *F25J 3/0242* (2013.01); *F28D 21/0001* (2013.01); *B01D 53/002* (2013.01); *B01D 53/1456* (2013.01); *B01D 53/263* (2013.01); *C02F 2103/08* (2013.01); *F25J 2240/60* (2013.01); *F25J 2260/02* (2013.01); *F25J 2270/12* (2013.01); *F25J 2270/60* (2013.01); *F25J 2270/902* (2013.01); *F28D 2021/0019* (2013.01)

(58) Field of Classification Search
CPC ... C02F 1/04; C02F 1/16; B01D 3/065; B01D 3/146; B01D 53/002; B01D 53/1456; B01D 53/263; B01D 1/0058; B01D 1/26; F25B 27/02; F25D 21/001
See application file for complete search history.

(56) References Cited

U.S. PATENT DOCUMENTS

| | | |
|---|---|---|
| 5,240,476 A | 8/1993 | Hegarty et al. |
| 5,557,936 A | 9/1996 | Drnevich et al. |
| 5,600,049 A | 2/1997 | Sy |
| 5,685,152 A | 11/1997 | Sterling |
| 6,216,436 B1 | 4/2001 | Ranasinghe |
| 6,733,636 B1 | 5/2004 | Heins et al. |
| 7,257,966 B2 | 8/2007 | Lee et al. |
| 7,458,231 B1 | 12/2008 | Vanden |
| 8,776,703 B2 | 7/2014 | Hall |
| 9,598,993 B2 | 3/2017 | Younes et al. |
| 9,657,937 B2 | 5/2017 | Niass |
| 9,745,871 B2 | 8/2017 | Noureldin et al. |
| 9,828,885 B2 | 11/2017 | Noureldin et al. |
| 9,851,153 B2 | 12/2017 | Noureldin et al. |
| 9,879,918 B2 | 1/2018 | Noureldin et al. |
| 9,891,004 B2 | 2/2018 | Noureldin et al. |
| 10,690,407 B2 | 6/2020 | Noureldin et al. |
| 10,851,679 B2 | 12/2020 | Noureldin et al. |
| 10,975,735 B2 | 4/2021 | Noureldin et al. |
| 10,989,078 B2 | 4/2021 | Noureldin |
| 2002/0166336 A1 | 11/2002 | Wilkinson et al. |
| 2006/0065015 A1 | 3/2006 | Mccoy |
| 2008/0174115 A1 | 7/2008 | Lambirth |
| 2008/0190135 A1 | 8/2008 | Mak |
| 2008/0289588 A1 | 11/2008 | Wees et al. |
| 2009/0000299 A1 | 1/2009 | Ast et al. |
| 2010/0326131 A1 | 12/2010 | Lengert |
| 2011/0000205 A1 | 1/2011 | Hauer |
| 2013/0334060 A1 | 12/2013 | Koseoglu et al. |
| 2013/0341929 A1 | 12/2013 | Ho |
| 2014/0037510 A1 | 2/2014 | Peng et al. |
| 2014/0090405 A1 | 4/2014 | Held et al. |
| 2014/0223911 A1 | 8/2014 | Ikegami |
| 2015/0377076 A1 | 12/2015 | Giegel et al. |
| 2015/0377079 A1 | 12/2015 | Noureldin et al. |
| 2016/0045841 A1 | 2/2016 | Kaplan et al. |
| 2016/0053184 A1 | 2/2016 | Wheeler et al. |
| 2016/0369674 A1 | 12/2016 | Younes et al. |
| 2017/0058708 A1 | 3/2017 | Noureldin et al. |
| 2017/0058711 A1 | 3/2017 | Noureldin et al. |
| 2017/0058719 A1 | 3/2017 | Noureldin et al. |
| 2017/0058721 A1 | 3/2017 | Noureldin et al. |
| 2019/0048759 A1 | 2/2019 | Noureldin et al. |
| 2020/0080447 A1 | 3/2020 | Noureldin et al. |
| 2020/0149827 A1 | 5/2020 | Noureldin et al. |
| 2020/0173735 A1 | 6/2020 | Noureldin et al. |
| 2020/0224558 A1 | 7/2020 | Noureldin et al. |
| 2020/0277882 A1 | 9/2020 | Noureldin et al. |

FOREIGN PATENT DOCUMENTS

| | | |
|---|---|---|
| WO | 2017035150 | 3/2017 |
| WO | 2017035166 | 3/2017 |

OTHER PUBLICATIONS

GCC Examination Report in GCC Appln. No. GC 2018-35794, dated May 30, 2020, 3 pages.
GCC Examination Report issued in Gulf Cooperation Council Application No. GC 2018-35795 dated Jun. 21, 2020, 3 pages.
GCC Examination Report issued in Gulf Cooperation Council Application No. GC 2018-35799 dated Jun. 22, 2020, 4 pages.
International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.

(56) References Cited

OTHER PUBLICATIONS

International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Gulf Cooperation Council Examination Report issued in GCC Application No. GC 2018-35796 dated Dec. 30, 2019, 5 pages.
Gulf Cooperation Council Examination Report issued in GCC Application No. GC 2018-35802 dated Dec. 30, 2019, 6 pages.
Gulf Cooperation Council Examination Report issued in GCC Application No. GC 2018-35793 dated Dec. 30, 2019, 5 pages.
Gulf Cooperation Council Examination Report issued in GCC Application No. GC 2018-35800 dated Dec. 30, 2019, 5 pages.
GCC Examination Report in GCC Appln. No. GC 2018-357994, dated Jan. 29, 2020, 6 pages.
GCC Examination Report in GCC Appln. No. GC 2018-35801, dated Feb. 9, 2020, 4 pages.
GCC Examination Report in GCC Appln. No. GC 2018-35799, dated Feb. 9, 2020, 4 pages.
GCC Examination Report in GCC Appln. No. GC 2018-35795, dated Feb. 9, 2020, 3 pages.
Ammar et al., "Low grade thermal energy sources and uses from the process industry in the UK," Applied Energy, Elsevier Science Publishers, vol. 89, No. 1, Jun. 1, 2011, 18 pages.
Bahnassi et al., "Achieving product specifications for ethane through to pentane plus from NGL fraction plants," AIChE Fall Conference, Jan. 1, 2005, 21 pages.
Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gnaneswar Gude et al., "Feasibility study of a new two-stage low temperature desalination process," Energy Conversation and Management, Elsevier Science Publishers, vol. 56, Nov. 30, 2011, 7 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Ophir et al., "Advanced MED process for most economical sea water desalination," Desalination, Elsevier, Amsterdam, NL, vol. 182, No. 1-3, Nov. 1, 2005, 12 pages.
Rahimi et al., "A novel process for low grade heat driven desalination," Desalination, Oct. 15, 2014, vol. 351, pp. 202-212.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Zhu et al., "Hybrid vapor compression refrigeration system with an integrated ejector cooling cycle," International Journal of Refrigeration, vol. 35, 1, pp. 68-78 11 pages.
Chinese Office Action in Chinese Appln. No. 201880061406.7, dated Sep. 18, 2020, 17 pages, English Translation.
Chinese Office Action in Chinese Appln. No. 201880063810.8, dated Sep. 21, 2020, 16 pages, English Translation.
Tong, "Introduction on Light Hydrocarbon Recovery Process in Onshore Terminal of the Chunxiao Gas Field," Natural Gas Technology, 2007, 1(1), 7 pages, English Abstract.
CN Office Action in Chinese Application No. 201880064998.8, dated Nov. 24, 2020, 8 pages (With English Translation).
GCC Examination Report in GCC Appln. No. GC 2018-35795, dated Oct. 28, 2020, 4 pages.
GCC Examination Report in GCC Appln. No. GC 2018-35799, dated Oct. 28, 2020, 3 pages.
CN Office Action in Chinese Appln. No. 201880064324.8, dated Oct. 28, 2020, 12 pages (With English Translation).
CN Office Action in Chinese Appln. No. 201880063809.5, dated Dec. 7, 2020, 13 pages (With English Translation).
CN Office Action in Chinese Appln. No. 201880063863, dated Dec. 7, 2020, 15 pages, (With English Translation).
CN Office Action in Chinese Appln. No. 201880065047.2, dated Dec. 9, 2020, 13 pages, (With English Translation).
CN Office Action in Chinese Appln. No. 201880063809.5, dated Apr. 7, 2021, 12 pages, (With English Translation).
CN Office Action in Chinese Appln. No. 201880063863.X, dated Apr. 7, 2021, 14 pages, (With English Translation).
CN Office Action in Chinese Appln. No. 201880064324.8, dated Apr. 12, 2021, 16 pages (With English Translation).

NATURAL GAS LIQUID FRACTIONATION PLANT WASTE HEAT CONVERSION TO SIMULTANEOUS POWER, COOLING AND POTABLE WATER USING INTEGRATED MONO-REFRIGERANT TRIPLE CYCLE AND MODIFIED MULTI-EFFECT-DISTILLATION SYSTEM

CROSS-REFERENCE TO RELATED APPLICATIONS

This application is a continuation of, and claims priority under 35 U.S.C. § 120 to, U.S. patent application Ser. No. 15/842,385, filed on Dec. 14, 2017, which in turn claims the benefit of priority to U.S. Provisional Patent Application Ser. No. 62/542,687 entitled "Utilizing Waste Heat Recovered From Natural Gas Liquid Fractionation Plants," which was filed on Aug. 8, 2017. The entire contents of both previous applications are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
|---|---|
| Degrees Celsius | ° C. |
| Megawatts | MW |
| One million | MM |
| British thermal unit | Btu |

TABLE 1-continued

| Unit of Measure | Abbreviation |
|---|---|
| Hour | hr. or H |
| Pounds per square inch (pressure) | psi |
| Kilogram (mass) | Kg |
| Second | s |
| Cubic meters per day | m³/day |
| Fahrenheit | F. |

In a general implementation, a system includes a first heating fluid circuit thermally coupled to first multiple heat sources of a natural gas liquid (NGL) fractionation plant. The system includes a second heating fluid circuit thermally coupled to second multiple heat sources of the NGL fractionation plant. The system includes an integrated triple cycle system thermally coupled to the first heating fluid circuit, the integrated triple cycle system including an organic Rankine cycle (ORC), a refrigeration cycle and an ejector refrigeration cycle. The ORC includes (i) a working fluid that is thermally coupled to the first heating fluid circuit to heat a first portion of the working fluid, and (ii) a first expander configured to generate electrical power from the heated first portion of the working fluid. The refrigeration cycle is thermally coupled to the first heating fluid circuit through the working fluid and configured to generate an amount of cooling power with a compressor. The ejector refrigeration cycle is fluidly coupled to the working fluid in an ejector of the ejector refrigeration cycle and configured to reduce a compression power of the compressor in the refrigeration cycle. The system includes a multi-effect-distillation (MED) system thermally coupled to the second heating fluid circuit and configured to produce potable water using at least a portion of heat from the second heating fluid circuit. The system includes a control system configured to actuate a first set of control valves to selectively thermally couple the first heating fluid circuit to at least a portion of the first multiple heat sources of the NGL fractionation plant, and to actuate a second set of control valves to selectively thermally couple the second heating fluid circuit to the at least one second heat source of the NGL fractionation plant.

In an aspect combinable with the general implementation, the MED system includes multiple trains thermally coupled to the second heating fluid circuit.

In another aspect combinable with any of the previous aspects, the multiple trains include three trains including a first train including six effects, a second train including four effects, and a third train including two effects.

In another aspect combinable with any of the previous aspects, The working fluid is thermally coupled to the first heating fluid circuit in a first evaporator of the ORC.

In another aspect combinable with any of the previous aspects, The working fluid includes propane.

In another aspect combinable with any of the previous aspects, The first and second heating fluid circuits include water or oil.

In another aspect combinable with any of the previous aspects, The system includes a condenser fluidly coupled to the expander, to the ejector, and to a condenser fluid source to cool the working fluid, and a pump to circulate the working fluid through the ORC.

In another aspect combinable with any of the previous aspects, The refrigeration cycle includes an evaporator thermally coupled to the working fluid to heat a second portion of the working fluid, where at least part of the second portion of the working fluid is fluidly coupled with the first portion of the working fluid and circulated to the expander, and a sub-cooler thermally coupled to the working fluid to heat a third portion of the working fluid.

In another aspect combinable with any of the previous aspects, Another part of the second portion of the working fluid and the third portion of the working fluid are fluidly coupled to the ejector.

In another aspect combinable with any of the previous aspects, The ejector is configured to vaporize the third portion of the working fluid with heat from the another part of the second portion of the working fluid to produce a vaporized working fluid.

In another aspect combinable with any of the previous aspects, The first multiple heat sources includes a first portion of sub-units of the NGL fractionation plant that includes an ethane system, a second portion of sub-units of the NGL fractionation plant that includes a propane system, a third portion of sub-units of the NGL fractionation plant that includes a butane system, a fourth portion of sub-units of the NGL fractionation plant that includes a pentane system, a fifth portion of sub-units of the NGL fractionation plant that includes a natural gasoline system, and a sixth portion of sub-units of the NGL fractionation plant that includes a solvent regeneration system.

In another aspect combinable with any of the previous aspects, The first portion of sub-units of the NGL fractionation plant includes at least one ethane system heat source, and includes a first ethane system heat source that includes a heat exchanger that is thermally coupled to an outlet stream of an ethane dryer.

In another aspect combinable with any of the previous aspects, The second portion of sub-units of the NGL fractionation plant includes at least four propane system heat sources, and includes a first propane system heat source that includes a heat exchanger that is thermally coupled to an outlet stream of a propane dehydrator, a second propane system heat source that includes a heat exchanger that is thermally coupled to an outlet stream of a propane vapor recovery compressor stream, a third propane system heat source that includes a heat exchanger that is thermally coupled to an outlet stream of a propane refrigeration compressor stream, and a fourth propane system heat source that includes a heat exchanger that is thermally coupled to an outlet stream of a propane main compressor stream.

In another aspect combinable with any of the previous aspects, The third portion of sub-units of the NGL fractionation plant includes at least four butane system heat sources, and includes a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms and a fourth butane system heat source that includes a heat exchanger that is thermally coupled to an outlet stream of a butane refrigeration compressor stream.

In another aspect combinable with any of the previous aspects, The fourth portion of sub-units of the NGL fractionation plant includes at least one pentane system heat source, and includes a first pentane system heat source that includes a heat exchanger that is thermally coupled to an outlet stream of a depentanizer overhead stream.

In another aspect combinable with any of the previous aspects, The fifth portion of sub-units of the NGL fractionation plant includes at least three natural gasoline system heat sources, and includes a first natural gasoline system heat source that includes a heat exchanger that is thermally coupled to an outlet stream of a natural gasoline decolorizing section pre-flash drum overhead stream, a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, The sixth portion of sub-units of the NGL fractionation plant includes at least two solvent regeneration system heat sources, and includes a first solvent regeneration system heat source that includes a heat exchanger that is thermally coupled to an outlet stream of an ADIP regeneration section overhead stream and a second solvent regeneration system heat source that includes a heat exchanger that is thermally coupled to an outlet stream of an ADIP regeneration section bottoms.

In another aspect combinable with any of the previous aspects, The second multiple heat sources includes a first portion of sub-units of the NGL fractionation plant that includes a propane system and a second multiple sub-units of the NGL fractionation plant that includes a butane system.

In another aspect combinable with any of the previous aspects, The first portion of sub-units of the NGL fractionation plant includes at least one propane system heat source, and includes a first propane system heat source that includes a heat exchanger that is thermally coupled to an outlet stream of a depropanizer overhead stream.

In another aspect combinable with any of the previous aspects, the second portion of sub-units of the NGL fractionation plant includes at least one butane system heat source, and includes a first butane system heat source that includes a heat exchanger that is thermally coupled to an outlet stream of a debutanizer overhead stream.

In another general implementation, a method of recovering heat energy generated by a NGL fractionation plant includes circulating a first heating fluid through a first heating fluid circuit that is thermally coupled to a first plurality of heat sources of a natural gas liquid (NGL) fractionation plant; circulating a second heating fluid through a second heating fluid circuit that is thermally coupled to a second plurality of heat sources of the NGL fractionation plant; generating electrical power with an organic Rankine cycle (ORC) that includes (i) a working fluid that is thermally coupled to the first heating fluid circuit to heat a first portion of the working fluid, and (ii) a first expander configured to generate the electrical power from the heated first portion of the working fluid; generating cooling power with a refrigeration cycle thermally coupled to the first heating fluid circuit through the working fluid and including a compressor to generate the cooling power while reducing a compression power of the compressor with an ejector refrigeration cycle fluidly coupled to the working fluid that comprises an ejector; producing potable water with a multi-effect-distillation (MED) system thermally coupled to the second heating fluid circuit using at least a portion of heat from the second heating fluid circuit; actuating, with a control system, a first set of control valves to selectively thermally couple the first heating fluid circuit to at least a portion of the first plurality of heat sources of the NGL fractionation plant; and actuating, with the control system, a second set of control valves to selectively thermally couple the second heating fluid circuit to the at least one second heat source of the NGL fractionation plant.

In an aspect combinable with the general implementation, the MED system includes multiple trains thermally coupled to the second heating fluid circuit.

In another aspect combinable with any of the previous aspects, the multiple trains include three trains including a first train including six effects, a second train including four effects, and a third train including two effects.

In another aspect combinable with any of the previous aspects, the working fluid is thermally coupled to the first heating fluid circuit in a first evaporator of the ORC.

In another aspect combinable with any of the previous aspects, the working fluid includes propane.

In another aspect combinable with any of the previous aspects, the first and second heating fluid circuits include water or oil.

In another aspect combinable with any of the previous aspects, the system includes a condenser fluidly coupled to the expander, to the ejector, and to a condenser fluid source to cool the working fluid, and a pump to circulate the working fluid through the ORC.

In another aspect combinable with any of the previous aspects, the refrigeration cycle includes an evaporator thermally coupled to the working fluid to heat a second portion of the working fluid, where at least part of the second portion of the working fluid is fluidly coupled with the first portion of the working fluid and circulated to the expander, and a sub-cooler thermally coupled to the working fluid to heat a third portion of the working fluid.

In another aspect combinable with any of the previous aspects, another part of the second portion of the working fluid and the third portion of the working fluid are fluidly coupled to the ejector.

In another aspect combinable with any of the previous aspects, the ejector is configured to vaporize the third portion of the working fluid with heat from the another part of the second portion of the working fluid to produce a vaporized working fluid.

In another aspect combinable with any of the previous aspects, the first multiple heat sources includes a first portion of sub-units of the NGL fractionation plant that includes an ethane system, a second portion of sub-units of the NGL fractionation plant that includes a propane system, a third portion of sub-units of the NGL fractionation plant that includes a butane system, a fourth portion of sub-units of the NGL fractionation plant that includes a pentane system, a fifth portion of sub-units of the NGL fractionation plant that includes a natural gasoline system, and a sixth portion of sub-units of the NGL fractionation plant that includes a solvent regeneration system.

In another aspect combinable with any of the previous aspects, the first portion of sub-units of the NGL fractionation plant includes at least one ethane system heat source, and includes a first ethane system heat source that includes a heat exchanger that is thermally coupled to an outlet stream of an ethane dryer.

In another aspect combinable with any of the previous aspects, the second portion of sub-units of the NGL fractionation plant includes at least four propane system heat sources, and includes a first propane system heat source that includes a heat exchanger that is thermally coupled to an outlet stream of a propane dehydrator, a second propane system heat source that includes a heat exchanger that is thermally coupled to an outlet stream of a propane vapor recovery compressor stream, a third propane system heat source that includes a heat exchanger that is thermally coupled to an outlet stream of a propane refrigeration compressor stream, and a fourth propane system heat source that includes a heat exchanger that is thermally coupled to an outlet stream of a propane main compressor stream.

In another aspect combinable with any of the previous aspects, the third portion of sub-units of the NGL fractionation plant includes at least four butane system heat sources, and includes a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms and a fourth butane system heat source that includes a heat exchanger that is thermally coupled to an outlet stream of a butane refrigeration compressor stream.

In another aspect combinable with any of the previous aspects, the fourth portion of sub-units of the NGL fractionation plant includes at least one pentane system heat source, and includes a first pentane system heat source that includes a heat exchanger that is thermally coupled to an outlet stream of a depentanizer overhead stream.

In another aspect combinable with any of the previous aspects, the fifth portion of sub-units of the NGL fractionation plant includes at least three natural gasoline system heat sources, and includes a first natural gasoline system heat source that includes a heat exchanger that is thermally coupled to an outlet stream of a natural gasoline decolorizing section pre-flash drum overhead stream, a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, the sixth portion of sub-units of the NGL fractionation plant includes at least two solvent regeneration system heat sources, and includes a first solvent regeneration system heat source that includes a heat exchanger that is thermally coupled to an outlet stream of an ADIP regeneration section overhead stream and a second solvent regeneration system heat source that includes a heat exchanger that is thermally coupled to an outlet stream of an ADIP regeneration section bottoms.

In another aspect combinable with any of the previous aspects, the second multiple heat sources includes a first portion of sub-units of the NGL fractionation plant that includes a propane system and a second multiple sub-units of the NGL fractionation plant that includes a butane system.

In another aspect combinable with any of the previous aspects, the first portion of sub-units of the NGL fractionation plant includes at least one propane system heat source, and includes a first propane system heat source that includes a heat exchanger that is thermally coupled to an outlet stream of a depropanizer overhead stream.

In another aspect combinable with any of the previous aspects, the second portion of sub-units of the NGL fractionation plant includes at least one butane system heat source, and includes a first butane system heat source that includes a heat exchanger that is thermally coupled to an outlet stream of a debutanizer overhead stream.

The details of one or more implementations of the subject matter described in this specification are set forth in the accompanying drawings and the detailed description. Other features, aspects, and advantages of the subject matter will become apparent from the description, the drawings, and the claims.

BRIEF DESCRIPTION OF THE DRAWINGS

FIG. 1O is a schematic diagram of heat exchangers in an ethane production section of a NGL fractionation plant.

DETAILED DESCRIPTION

NGL Plant

Figure 1A:
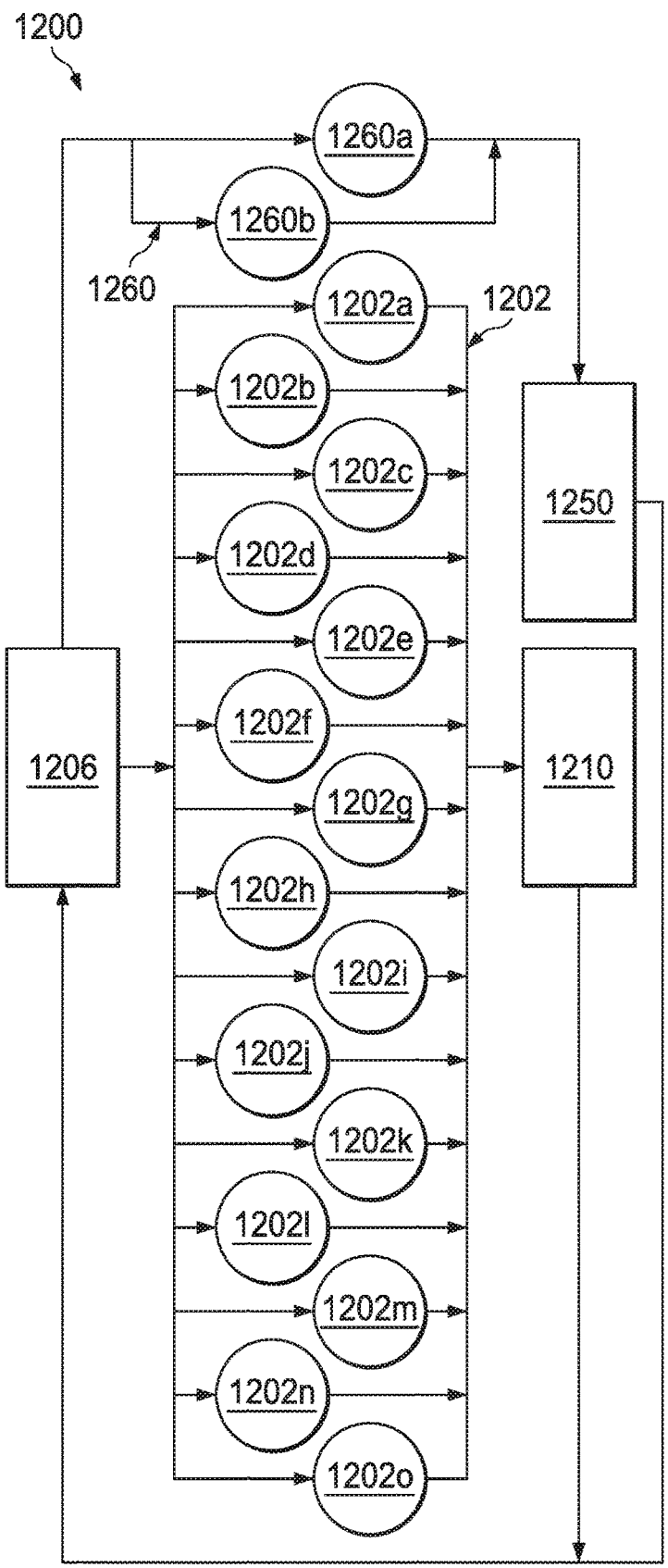
FIG. 1A illustrates a schematic diagram of an example system to recover waste heat from heat sources in a NGL fractionation plant.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a depentanizer condenser, an amine-di-iso-propanol (ADIP) cooler, a regenerator overhead (OVHD) condenser, a Reid vapor pressure (RVP) column condenser, a depropanizer condenser, a debutanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG decolorizer condenser, or combinations thereof Fractionation Section Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. Deethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL." Depropanizing and debutanizing separate propane and butane, respectively, from C3+ NGL and C4+ NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the deethanizer, about 50 trays in the depropanizer, and about 55 trays in the debutanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the deethanizing module, the depropanizing module and the debutanizing module, each of which is described later.

Deethanizer Module (or Deethanizer Column)

The C2+ NGL is pre-heated before entering the deethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the deethanizer reboiler is C3+ NGL, which is sent to the depropanizer module.

Depropanizer Module (or Depropanizer Column)

From the deethanizer module, C3+ NGL enters the depropanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the debutanizer module Debutanizer Module (or Debutanizer Column)

C4+ enters the debutanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two dehydrators containing molecular sieve desiccant beds. One dehydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the dehydrator, dry C3/C4 products flow to refrigeration.

Natural Gasoline (NG) Processing Section

NG processing includes RVP control, decolorizing and depentanizing sections.

RVP Control Section

A Reid vapor pressure (RVP) control section (or rerun unit) is a fractionator column that receives the C5+ NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

Decolorizing Section

The decolorizing section removes color bodies from NG. Color bodies are traces of heavy ends found in the debutanizer bottoms product. Other impurities such as corrosion products from the pipeline may also be present. These must be removed for NG to meet the color specification. Decolorizer feed can be RVP column bottoms product or debutanizer bottoms product, or a combination of both. Additional natural gasoline can also be supplied from other facilities to maintain a hexane plus (C6+) product supply. If decolorizing is needed, NG first passes through a pre-flash-drum. A large portion of the lighter NG components vaporizes and leaves the drum as overhead. The heavier NG components remain along with the color bodies and are fed to the decolorizer column, where the remaining color bodies are separated.

The NG leaves the decolorizer as overhead gas and is condensed and collected in the NG product drum, with some pumped back to the column as reflux. Overhead from the column and flash drum are joined and pumped to either the depentanizer (described later) or cooled and sent to storage in the feed product surge unit. The color bodies leave the decolorizer as bottoms product and are pumped to the feed and surge unit to be injected into a crude line.

Depentanizing Section

Depentanizing uses a fractionation column to produce a pentane overhead product and a C6+ bottoms product. Both the pentane product and the C6+ bottoms product are separately fed to storage or downstream the petrochemical plants. The feed to the depentanizer is the NG product stream from the decolorizing section. Feed can be increased or decreased based on the demand for C6+ bottoms product. If the NGL fractionation plant NG production cannot meet demand, NG can be imported from oil refineries. The decolorized NG is preheated before entering the depentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the depentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane dehydration condenser | 22 |
| Butane dehydrator condenser | 9 |
| Naphtha cooler | 11 |
| Depentanizer condenser | 100 |
| ADIP cooler | 73 |
| Regenerator OVHD condenser | 18 |
| NG flash vapor condenser | 107 |
| NG decolorizer condenser | 53 |
| Natural gasoline (cooling) | 29 |
| process propane condenser | |
| Fractionation propane condenser | 81 |
| Air cooled condenser | 16 |
| Regeneration gas cooler | 22 |
| RVP column condenser | 36 |
| Butane condenser | 49 |
| Depropanizer condenser | 194 |
| Debutanizer condenser | 115 |

In Table 2, "Duty/train" represents each stream's thermal duty in millions Btu per hour (MMBtu/hr.) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m³/day (for example, 120,000 m³/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr.), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and such instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

Figure 1B:
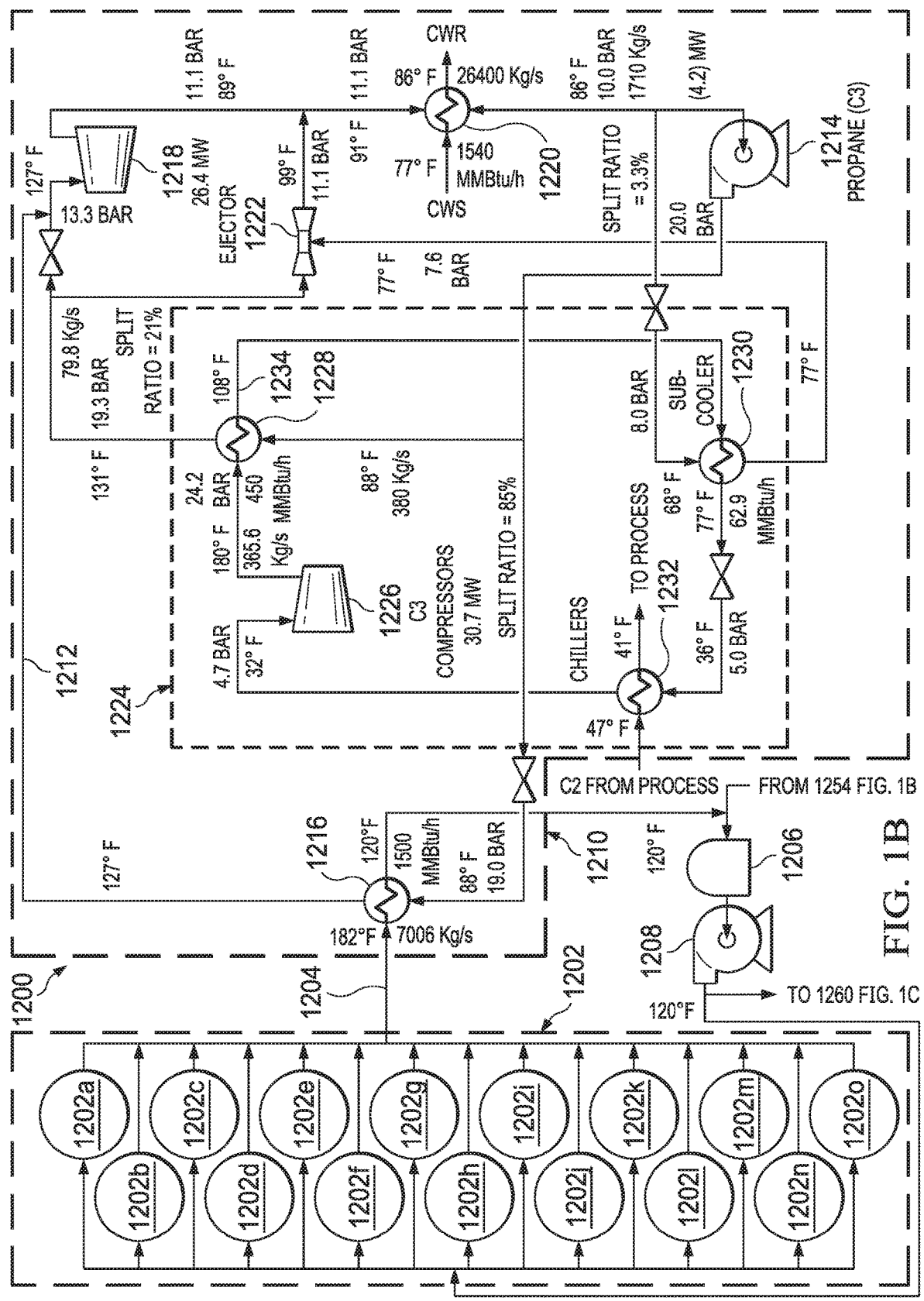
FIG. 1B illustrates a schematic diagram of an example system to recover waste heat from heat sources in a NGL fractionation plant.
Figure 1C:
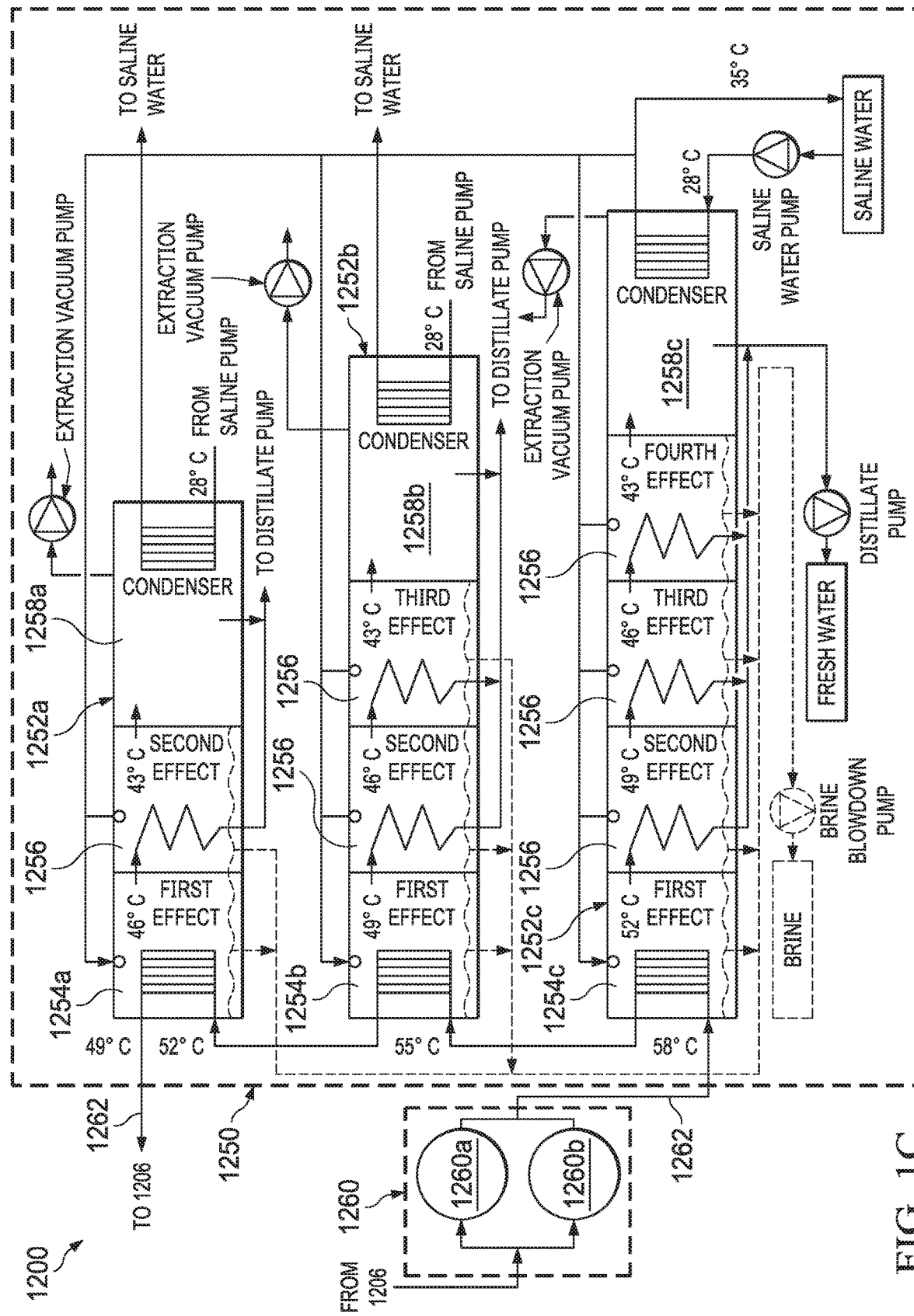
FIG. 1C is a schematic diagram of a multi-effect-distillation (MED) system to recover potable water that is thermally coupled to the system to recover waste heat from heat sources in a NGL fractionation plant.
Figure 1D:
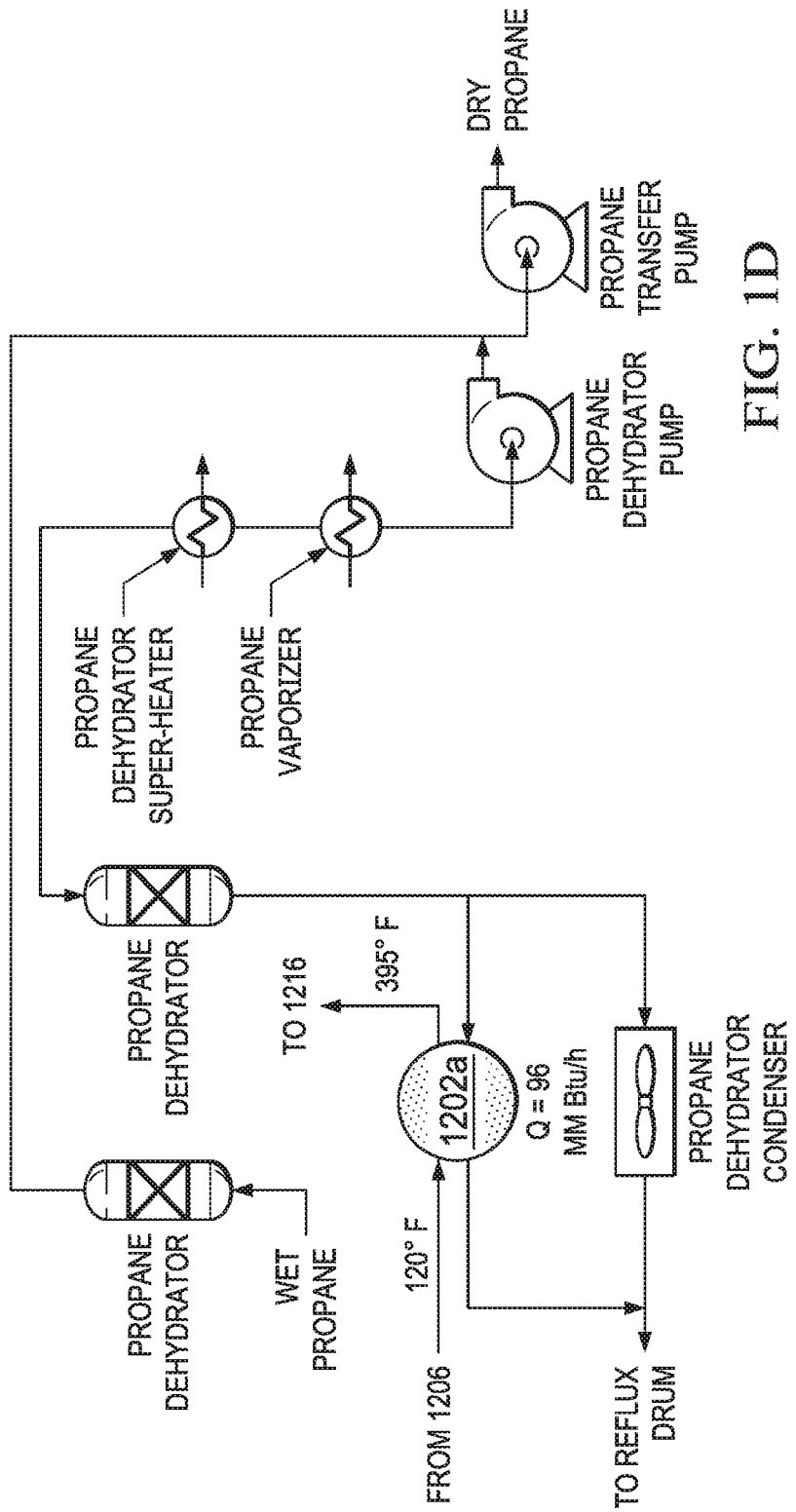
FIG. 1D is a schematic diagram of a heat exchanger in a propane dehydration section of a NGL fractionation plant.
Figure 1E:
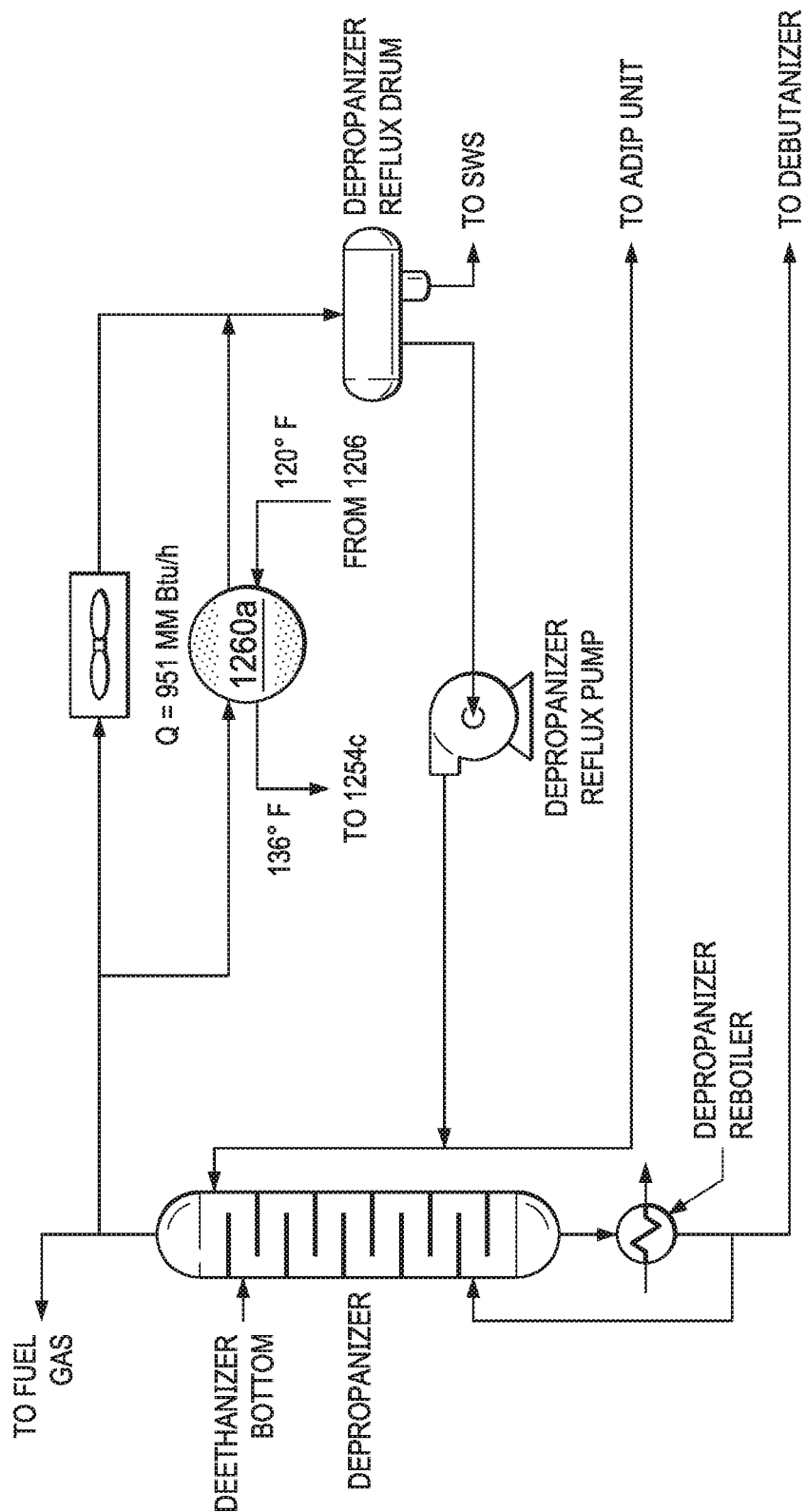
FIG. 1E is a schematic diagram of a heat exchanger in a depropanizer section of a NGL fractionation plant.
Figure 1F:
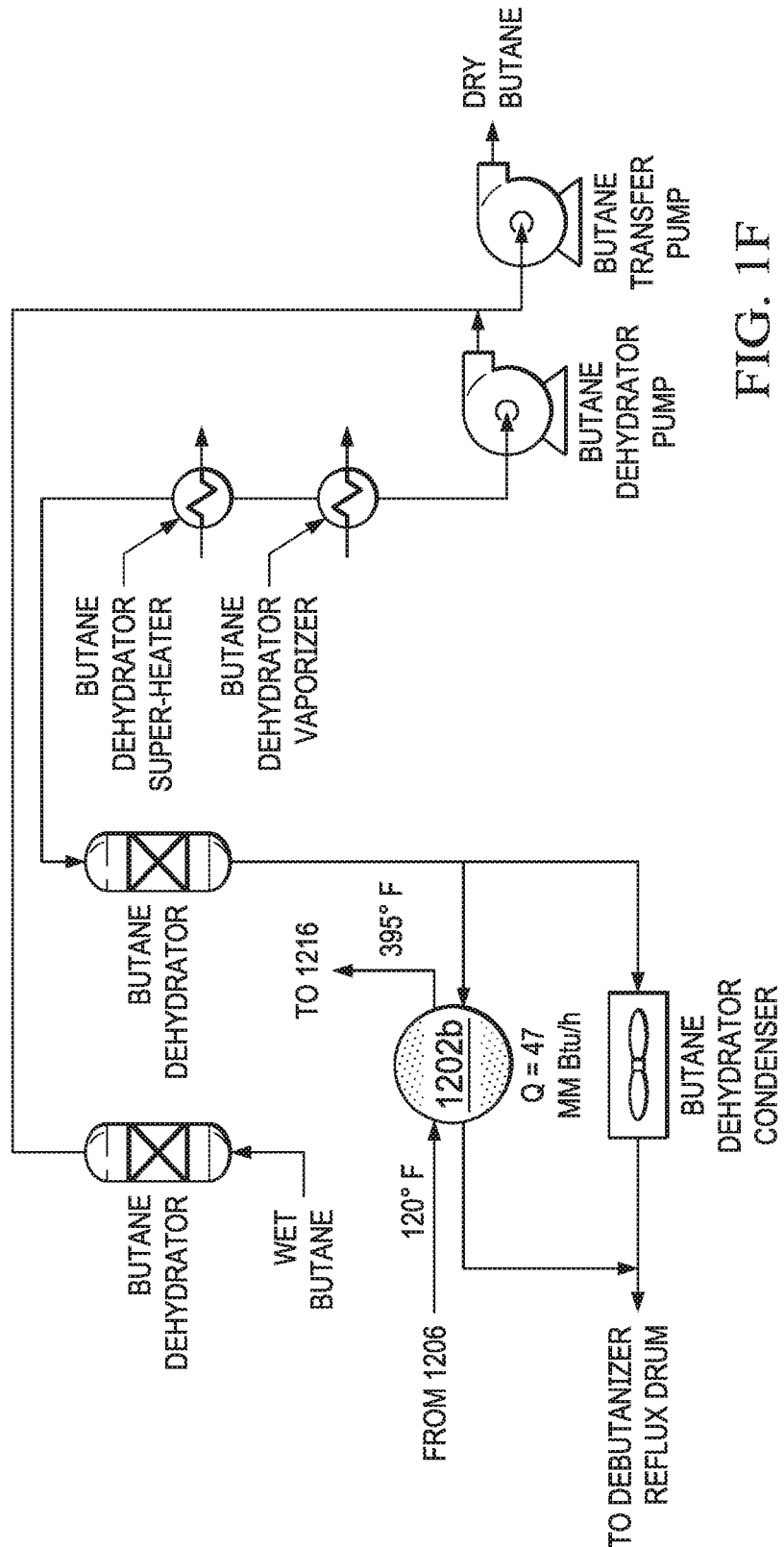
FIG. 1F is a schematic diagram of a heat exchanger in a butane dehydration section of a NGL fractionation plant.
Figure 1G:
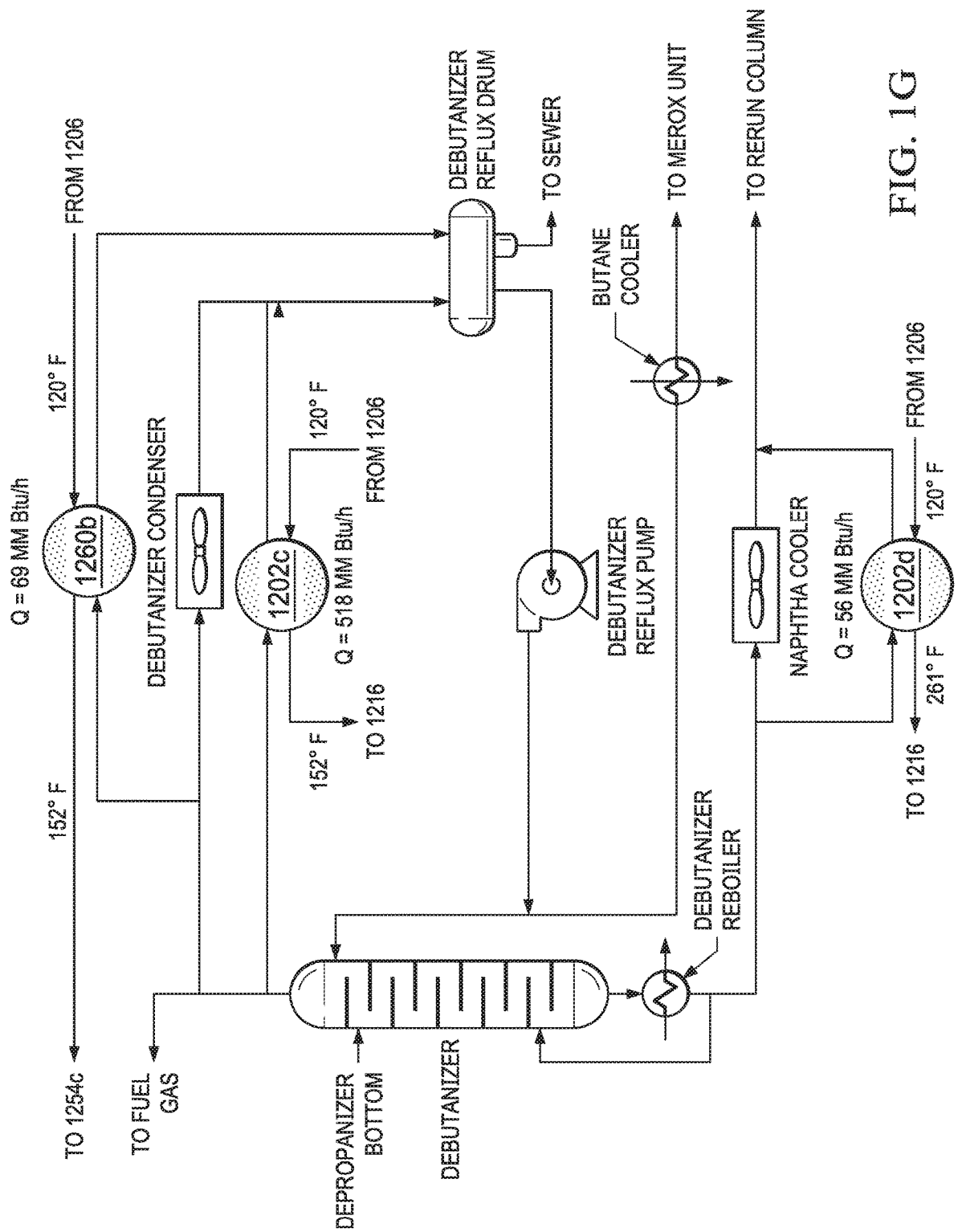
FIG. 1G is a schematic diagram of heat exchangers in a debutanizer section of a NGL fractionation plant.
Figure 1H:
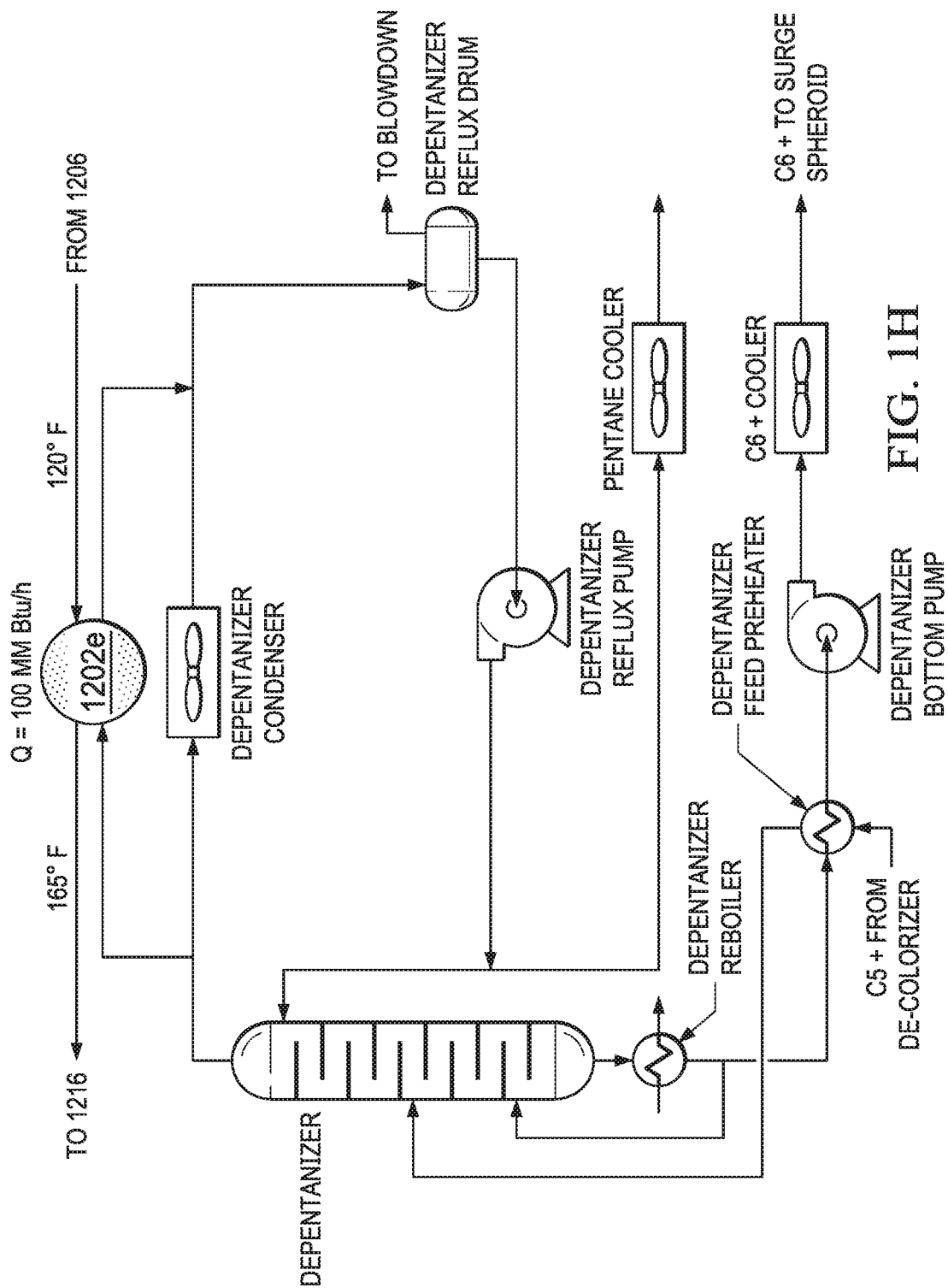
FIG. 1H is a schematic diagram of a heat exchanger in a depentanizer section of a NGL fractionation plant.
Figure 1I:
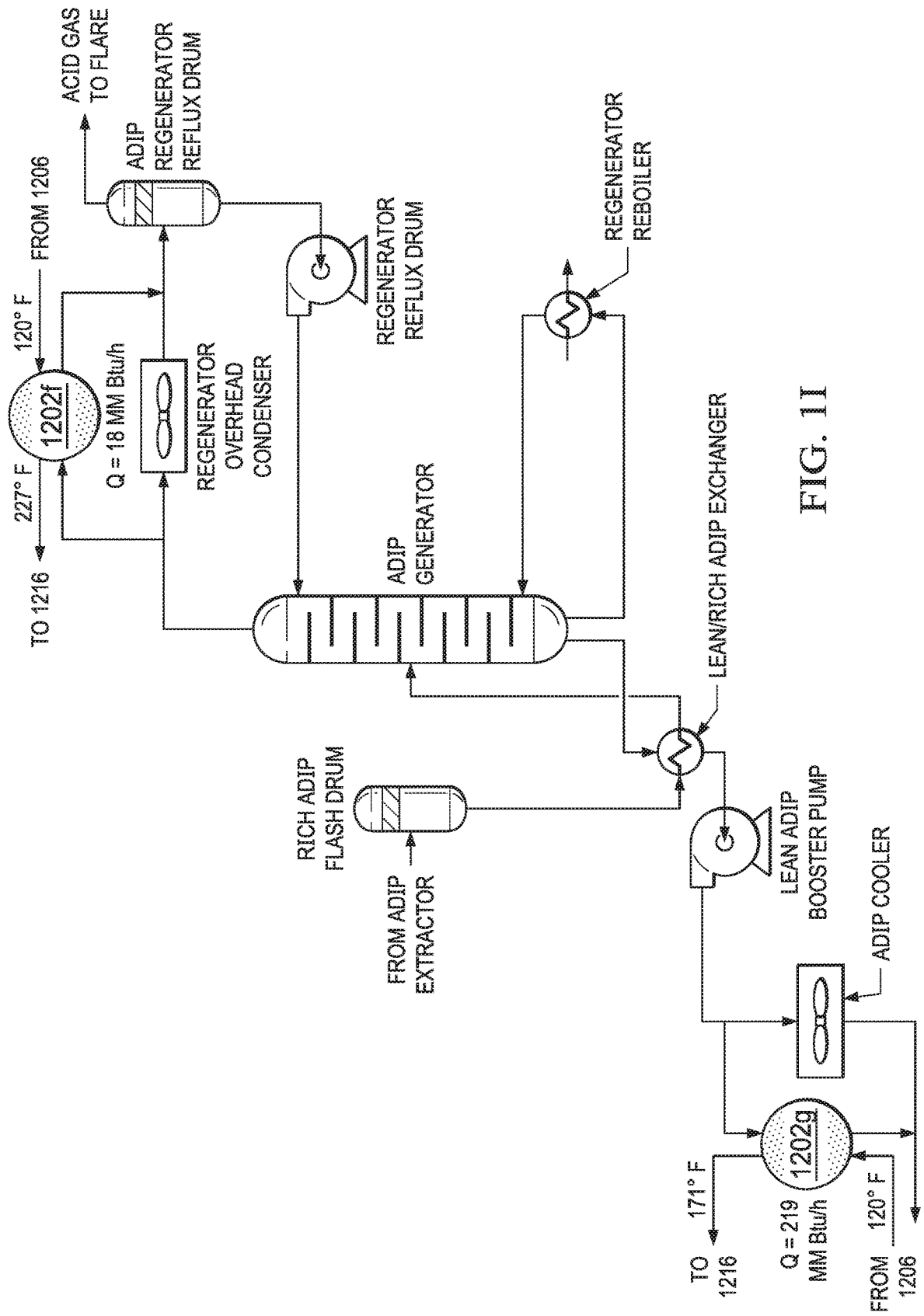
FIG. 1I is a schematic diagram of heat exchangers in an ADIP regeneration section of a NGL fractionation plant.
Figure 1J:
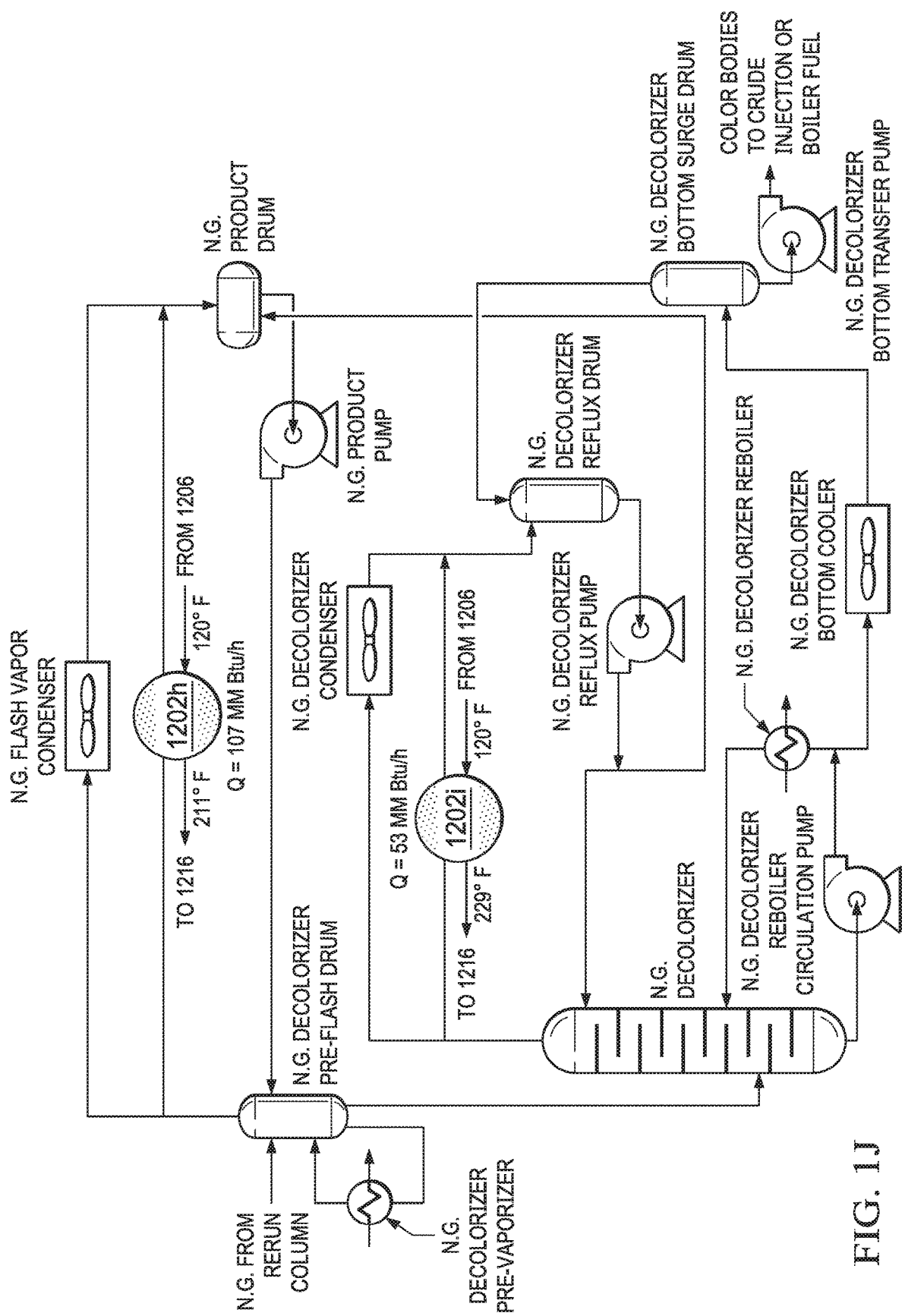
FIG. 1J is a schematic diagram of heat exchangers in a natural gasoline decolorizing section of a NGL fractionation plant.
Figure 1K:
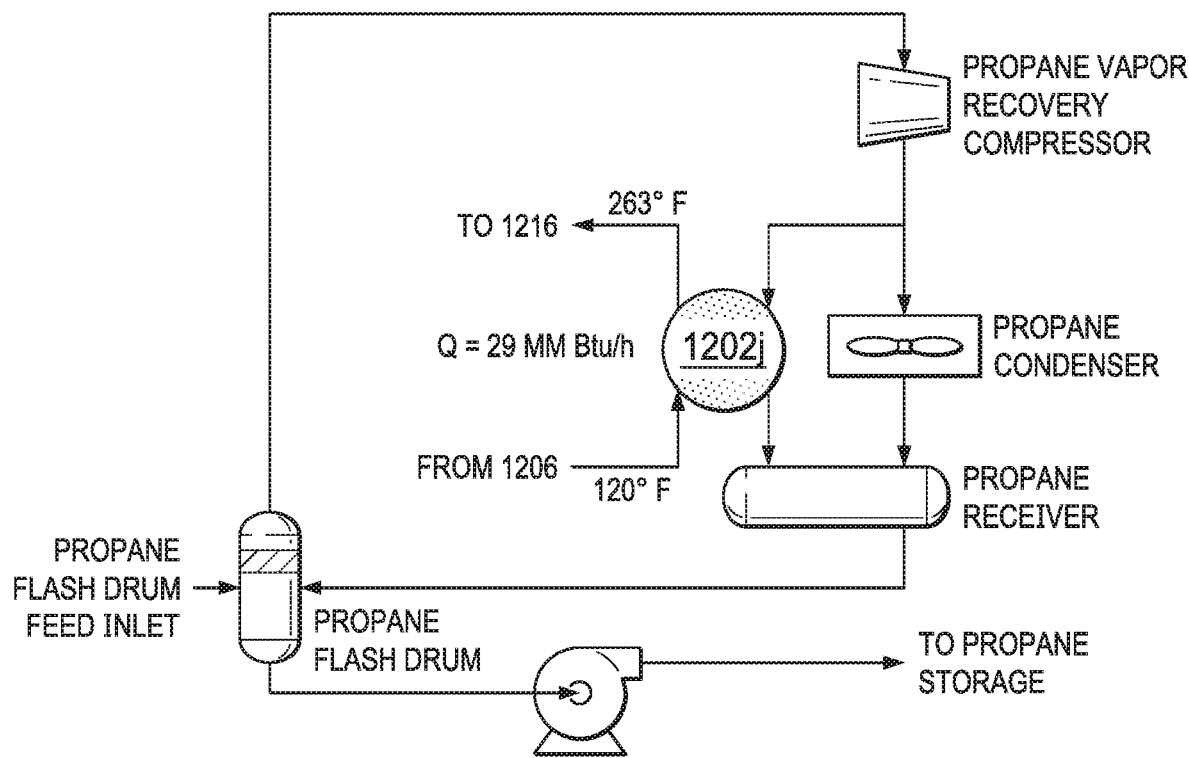
FIG. 1K is a schematic diagram of a heat exchanger in a propane tank vapor recovery section of the NGL fractionation plant.
Figure 1L:
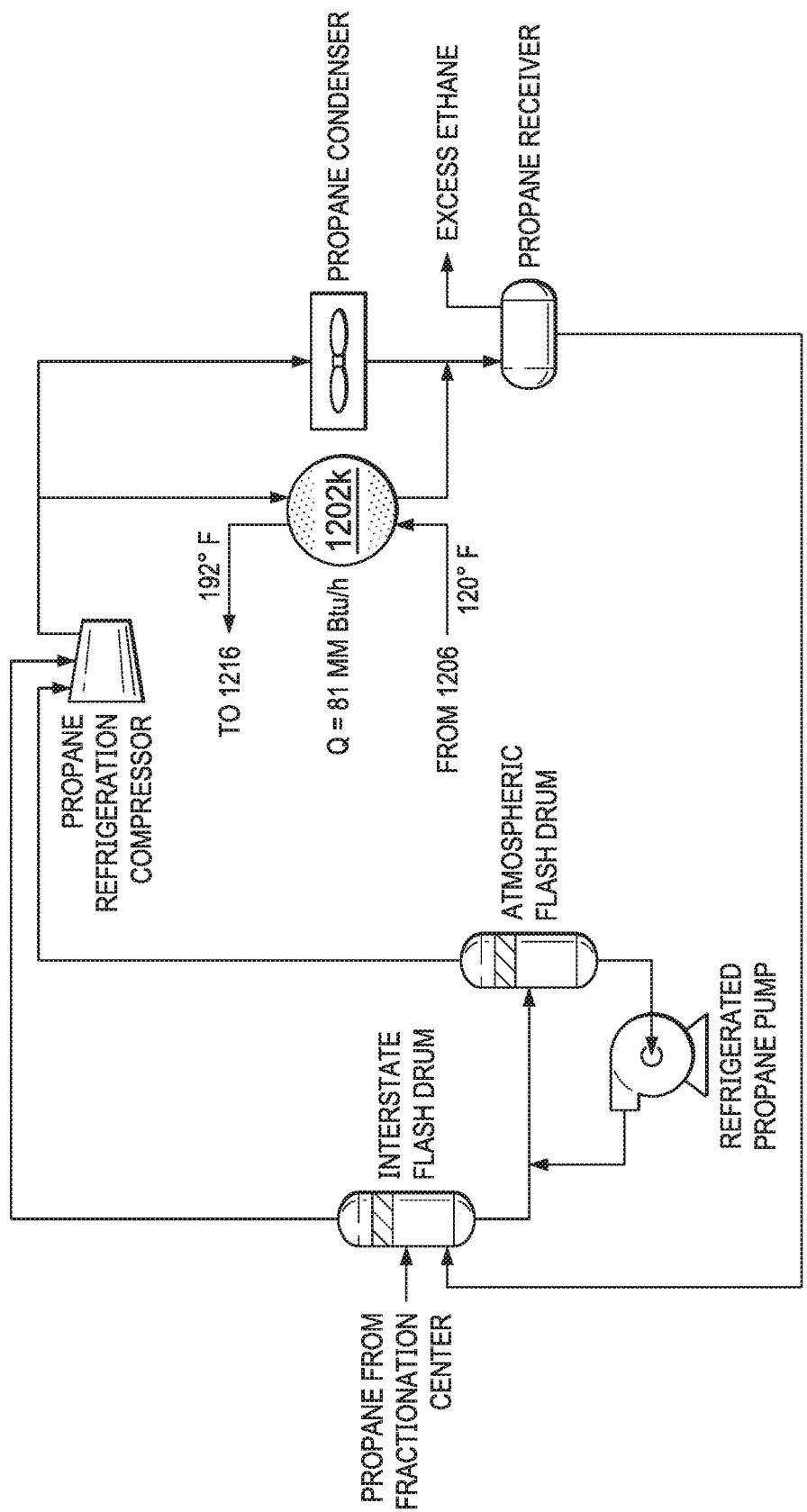
FIG. 1L is a schematic diagram of a heat exchanger in a propane product refrigeration section of the NGL fractionation plant.
Figure 1M:
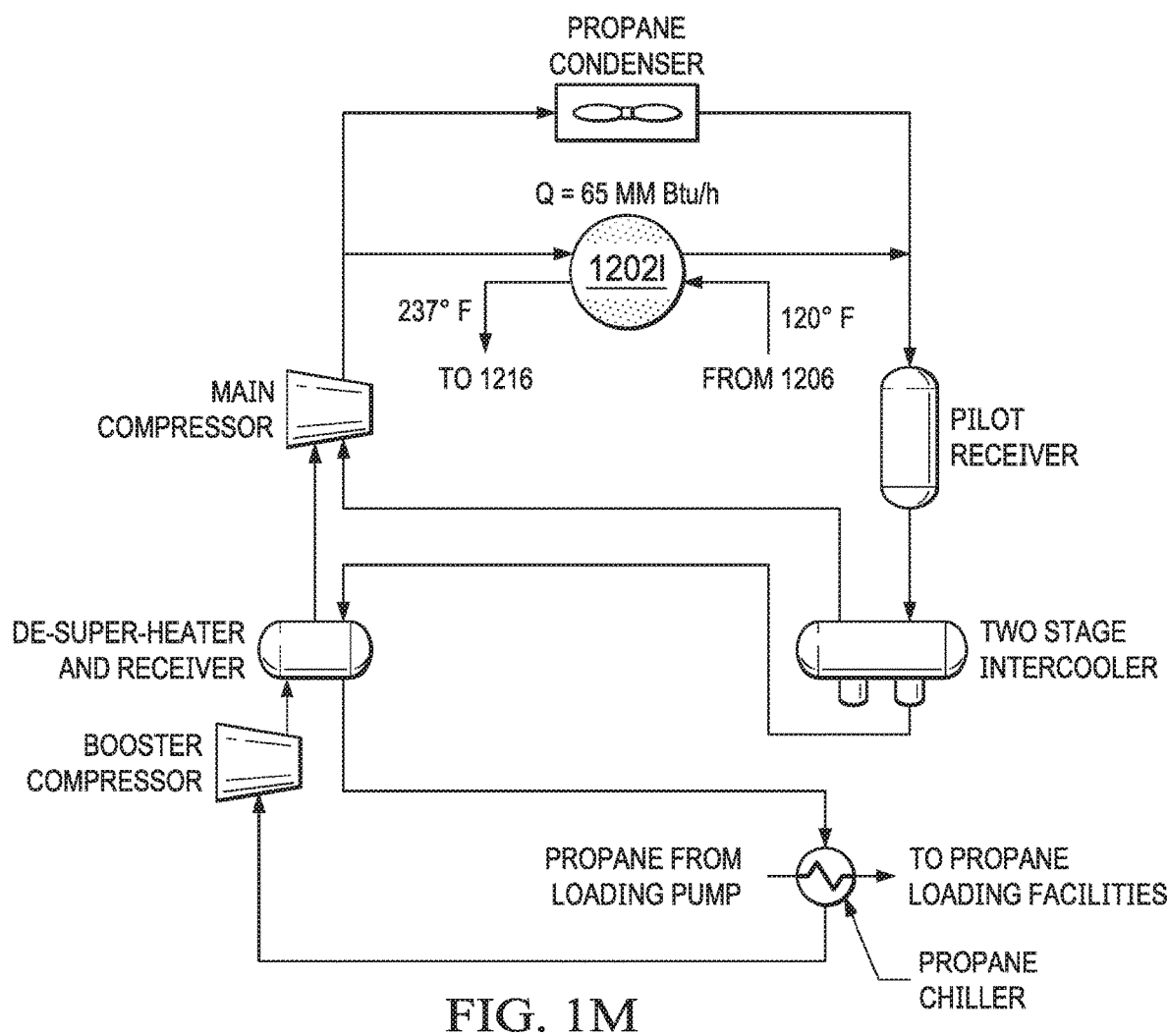
FIG. 1M is a schematic diagram of a heat exchanger in a propane product sub-cooling section of the NGL fractionation plant.
Figure 1N:
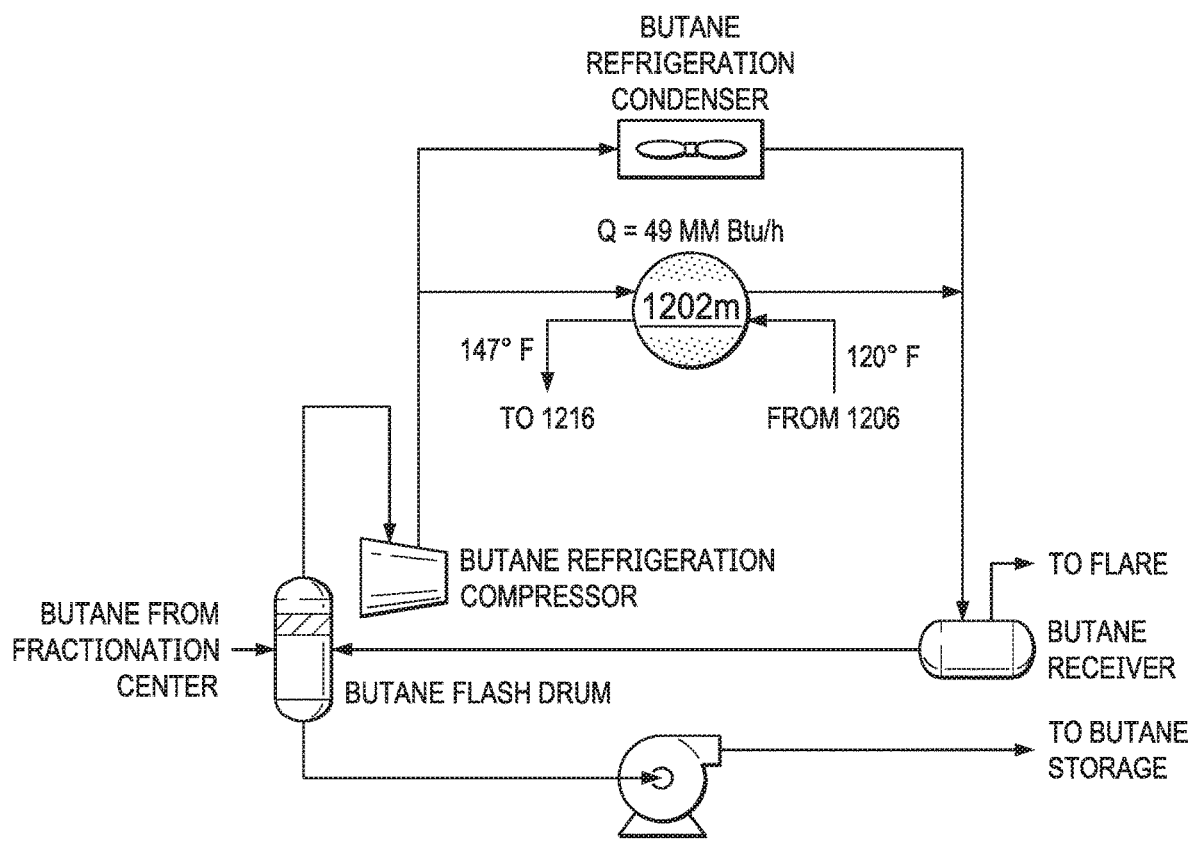
FIG. 1N is a schematic diagram of a heat exchanger a butane product refrigeration section of the NGL fractionation plant.
Figure 10:
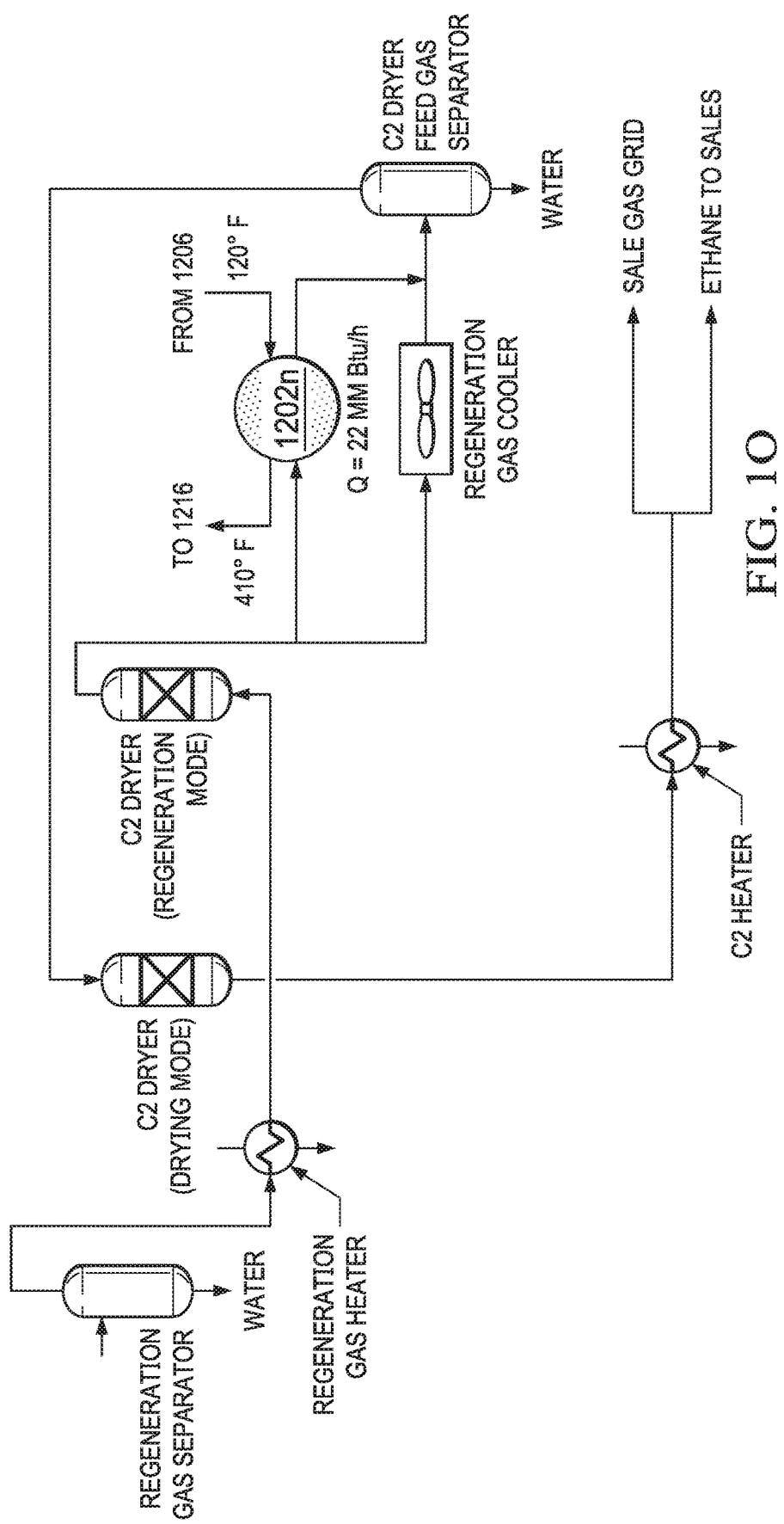
Figure 1P:
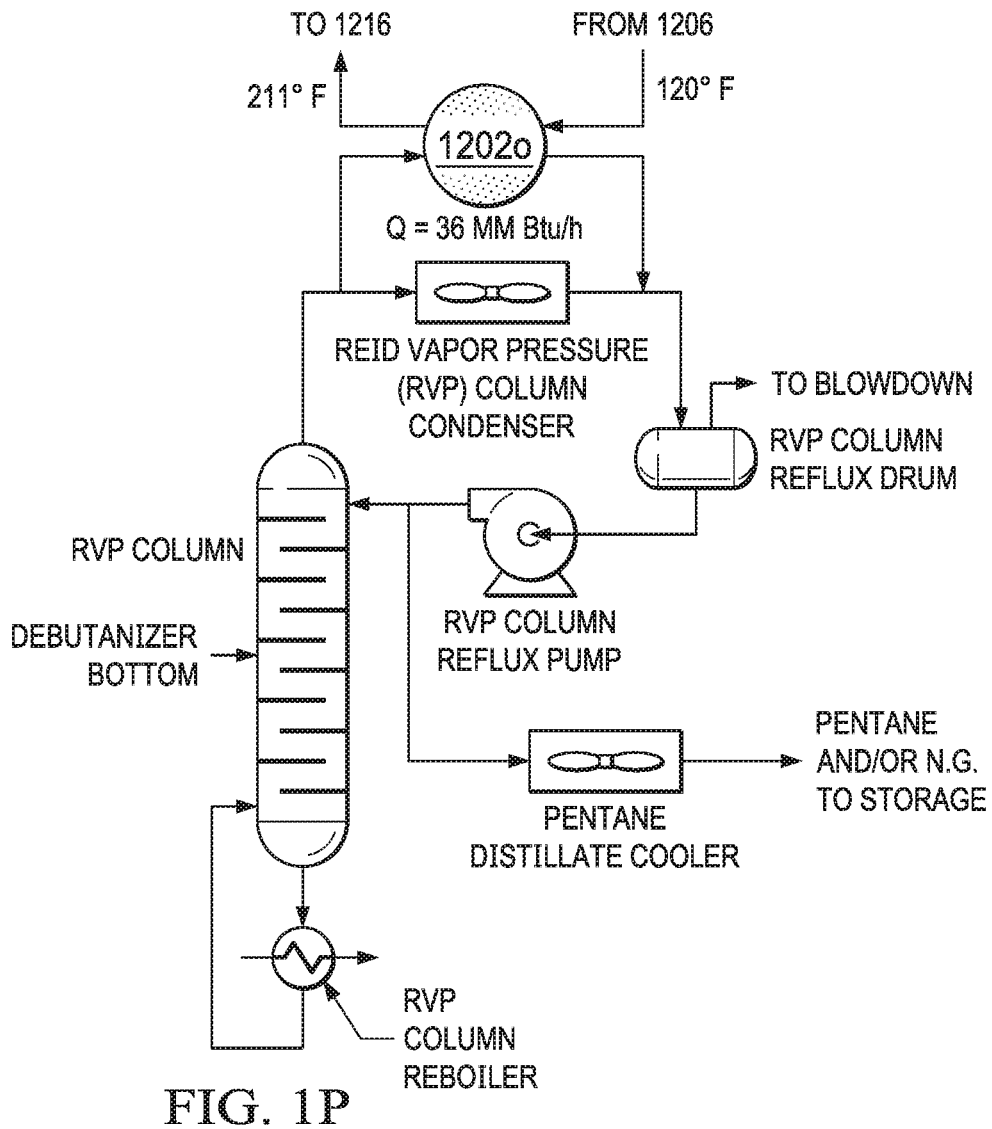
FIG. 1P is a schematic diagram of a heat exchanger in a natural gasoline vapor pressure control section of the NGL fractionation plant.

FIGS. 1A-1P are schematic illustrations of a power generation, multi-effect distillation (MED), and refrigeration system that utilizes waste heat from one or more heat sources in a natural gas liquid (NGL) fractionation plant.

FIGS. 1A-1C are schematic diagrams of an example system 1200 to recover waste heat from heat sources in an NGL fractionation plant with a chiller system 1224, a potable water conversion multi-effect-distillation (MED) system 1250, and a mono-refrigerant triple cycle (MRTC) compressor-turbine-ejector system 1210 using a single heating buffer fluid. FIGS. 1D-1P are schematic diagrams illustrating the location of the heat sources within the NGL fractionation plant, as well as the interaction (for example, fluid and thermal) with existing components of the NGL fractionation plant. In this example system 1200, there are nineteen heat sources in the NGL fractionation plant. In this example system 1200, a portion of the nineteen heat sources in the NGL fractionation plant (for example, seventeen in this example implementation) are divided into two heating fluid circuits (circuits 1202 and 1260) from a heating fluid buffer tank 1206. In this example system 1200, one of the two heating fluid circuits serves the cooling system 1224 and the MRTC compressor-turbine-ejector system 1210, and another of the two heating fluid circuits serves the MED system 1250, using the same heating buffer fluid. In alternative implementations, there may be two separate heating fluid circuits (with two independent tanks and two different or similar buffer fluids).

Generally, the NGL fractionation plant contains a large amount of low grade waste heat. This waste heat can be used to produce water, cooling, power, or a combination of two or more. In some aspects, embodiments of the present disclosure include a system (such as system 1200) that recovers the waste heat available in the NGL fractionation plant using a heat recovery network that includes multiple (for example, nineteen in some embodiments) heat exchangers distributed in particular areas of the NGL fractionation plant. In some embodiments, the system 1200 can generate about 26 MW of power using the MRTC compressor-turbine-ejector system 1210, about 63 MM Btu/h sub-ambient cooling capacity using the chiller system 1224, and about 32,000 m³/day of potable water from salt (or brackish) water using the MED system 1250. The low grade waste heat is recovered from processing units within the NGL fractionation using, for example, the one or more buffer streams such as hot oil or pressurized water streams.

In example embodiments as shown in FIGS. 1A-1C, two buffer streams flow from a storage tank at about 120° F. and are directed towards specific units in the NGL fractionation plant to recover particular amounts of thermal energy, as shown in FIGS. 1D-1P. The thermal energy absorbed from the NGL fractionation plant increases the two buffer streams original temperature from about 120° F. to about 136° F. in a buffer stream 1262 and from about 120° F. to about 187° F. in a buffer stream 1204. The buffer streams at 136° F. and 187° F. are then used as shown in FIGS. 1B-1C to produce the 26 MW of power using the MRTC compressor-turbine-ejector system 1210, the 63 MM Btu/h sub-ambient cooling capacity using the chiller system 1224, and the 32,000 m³/day of potable water from salt (or brackish) water using the MED system 1250. The buffer streams are reduced in temperature in the respective systems 1210 and 1250 to about 120° F. and flow back to the storage tank, where they are recombined.

FIGS. 1A-1C illustrate schematic diagrams of the example system 1200 to recover waste heat from the nineteen heat sources in the NGL fractionation plant. In some implementations, the system 1200 can include a first heating fluid circuit 1202 thermally coupled to a portion of the multiple heat sources. For example, the portion of multiple heat sources that are thermally coupled to the first heating fluid circuit 1202 can include fifteen of the nineteen heat exchangers, including a first heat exchanger 1202a, a second heat exchanger 1202b, a third heat exchanger 1202c, a fourth heat exchanger 1202d, a fifth heat exchanger 1202e, a sixth heat exchanger 1202f, a seventh heat exchanger 1202g, an eighth heat exchanger 1202h, a ninth heat exchanger 1202i, a tenth heat exchanger 1202j, an eleventh heat exchanger 1202k, a twelfth heat exchanger 12021, a thirteenth heat exchanger 1202m, a fourteenth heat exchanger 1202n, and a fifteenth heat exchanger 1202o. In some implementations, the fifteen heat sources can be connected in parallel, relative to the flow of the first buffer fluid. In some implementations, a single heat exchanger shown in a figure may illustrate one or more heat exchangers.

The system 1200, as shown in FIG. 1C, can also include a second heating fluid circuit 1260 that is thermally coupled to another portion of the multiple heat sources. For example, the portion of multiple heat sources that are thermally coupled to the second heating fluid circuit 1260 can include two of the nineteen heat exchangers, including heat exchangers 1260a and 1260b. In some implementations, the two heat sources can be connected in parallel within the flow of the second buffer fluid. In some implementations, a single heat exchanger shown in a figure may illustrate one or more heat exchangers.

As shown in FIG. 1B, the illustrated MRTC compressor-turbine-ejector system 1210 (or "MRTC system 1210") includes a working fluid circuit 1212 that, in this example, may circulate a propane liquid working fluid. The MRTC system 1210 is thermally coupled to the first heating fluid circuit 1202 in heat exchanger 1216. The MRTC system 1210 is also thermally coupled to the chiller system 1224 in heat exchangers 1228 and 1230. Generally, the MRTC system 1210 includes a gas expander 1218 configured to generate electrical power from the heated working fluid 1212 (for example, heated by the heat exchangers 1216 and 1228). As shown in FIG. 1B, the MRTC system 1210 can additionally include an ejector 1222, a pump 1214, and a condenser 1220.

In operation of the MRTC compressor-turbine-ejector system 1210, a first heating fluid 1204 (for example, water, oil, or such fluid) is circulated through the fifteen heat exchangers of the first heating fluid circuit 1202. An inlet temperature of the first heating fluid 1204 that is circulated into the inlets of each of the fifteen heat sources is the same or substantially the same subject to any temperature variations that may result as the first heating fluid 1204 flows through respective inlets. Each heat exchanger heats the first heating fluid 1204 to a respective temperature that is greater than the inlet temperature. The heated first heating fluid 1204 from the fifteen heat exchangers are combined and are flowed through the evaporator 1216 of the ORC. Heat from the heated first heating fluid 1204 heats the working fluid 1212 of the ORC thereby increasing the working fluid temperature and evaporating the working fluid 1212. The heat exchange with the working fluid 1212 results in a decrease in the temperature of the first heating fluid 1204.

The flow of the first heating fluid 1204 is then collected in a heating fluid tank 1206 and can be pumped, by the pump 1214, back through the seventeen heat exchangers of the first heating fluid circuit 1202 to restart the waste heat recovery cycle.

FIG. 1C shows MED system 1250 that, in this example, can operate to produce about 32,000 m$^3$/day of potable water. The system 1250, in this example, includes three trains 1252a, 1252b, and 1252c coupled in series such that a flow of the second heating fluid 1262 flows from the third train 1252c, then to the second train 1252b, and then to the first train 1252a. Such trains 1252a-c can be independent and installed on stages/phases. Each train 1252a-c can consist of several modules of the exact same or similar design in parallel, for example, to use standard commercial designs of MED units. For example, each train 1252a-c can consist of multiple effects or "stages" 1256, such as between two and four stages as shown. Each train 1252a-c may include an inlet stage 1254a-c, respectively, and one or more additional stages 1256 as shown. Each inlet stage 1254a-c is fluidly coupled with the second heating fluid 1262. Generally, each stage 1256 consists of a heat exchanger in which a feed water (for example, sea, brackish, or salt water) is heated. In each stage 1256, the feed water is heated by steam or hot liquid in tubes. Some of the feed water evaporates, and the evaporated feed water steam flows into the tubes of the next stage 1256, condensing into liquid potable water. The condensation releases heat, which evaporates more feed water. Thus, each stage 1256 reuses the energy from the previous stage.

In some aspects, the heat exchanger tubes in each stage 1256 can be submerged in the feed water, but alternatively the feed water may be sprayed on the top of a bank of horizontal tubes, and then drips from tube to tube until it is collected at the bottom of the stage 1256 as shown. The thinner the metal in the tubes and the thinner the layers of liquid on either side of the tube walls, the more efficient is the energy transport from stage to stage. Introducing more stages 1256 between the heat source (the second heating fluid 1262) and sink (saline water used in the condenser stages 1258a-c) reduces the temperature difference between the stages 1256 and greatly reduces the heat transport per unit surface of the tubes. The energy supplied is reused more times to evaporate more water, but the process takes more time. The amount of water distilled per stage is directly proportional to the amount of energy transport. If the transport is slowed, the surface area per stage can be increased by, for example, increasing the number and length of the tubes, at the expense of increased installation cost.

As shown, the third train 1252c includes an inlet heat exchanger 1254c that receives the second heating fluid 1262 from the heat exchanger system 1260. Heat exchanger system 1260 includes heat exchangers 1260a and 1260b, which are, in this example, shown in parallel relative to a flow of the second heating fluid 1262. The second heating fluid 1262 is circulated through the inlet heat exchanger (or inlet stage) 1254c, then to the inlet stage 1254b, then to the inlet stage 1254a, and then back to the heating fluid tank 1206.

As shown, concentrated salt water (or brine) is collected at the bottom of each stage 1256 and delivered to a brine blowdown pump to be removed. A flow of saline water (acting as a condenser, as explained later) can be sprayed on the tubes in the next stage 1256, since the saline water has a suitable temperature and pressure near or slightly greater than the operating temperature and pressure in the next stage 1256. Some of the saline water will flash into potable steam as it is released into the particular stage 1256. In some aspects, the lowest pressure stages 1256 need relatively more surface area to achieve the same energy transport across the tube walls. The expense of installing this surface area limits the usefulness of using very low pressures and temperatures in the later stages 1036. Gases dissolved in the feed water may contribute to reducing the pressure differentials if they are allowed to accumulate in the stages.

As shown, the first and last stages need external heating and cooling respectively. The heating in the inlet stages 1254a-c comes from the second heating fluid 1262. The cooling in the condenser stages 1258a-c comes from a flow of saline water that acts as a condenser water. The amount of heat removed from the condenser stages 1258a-c may equal or nearly equal the amount of heat supplied to the first stages 1254a-c by the second heating fluid 1262. In some aspects, for sea water desalination, even the first and warmest stage is typically operated at a temperature less than 70° C. to avoid scale formation.

Condensate (fresh water) from all the tubes in all the stages 1254a-c, 1256, and 1258a-c may be pumped out from the respective pressures of the stages to the ambient pressure. The brine collected at the bottom of the condenser stages 1258a-c may be pumped out since it has a lower pressure than the ambient pressure. In some implementations, the second heating fluid 1262 enters the inlet stage 1254c at 58° C. and exits the inlet stage 1254a at about 49° C. to fully utilize the available waste heat in water generation. The greatest brine temperature is about 52° C.

In operation, the MED system 1250 includes a feed water (salt water) distributed onto the heat exchanger of the first effects 1254a-c in all of the trains 1252a-c. The second heating fluid 1262 that flows through the heat exchangers in the first effects 1254a-c and releases its energy to the distributed feed water and evaporates a portion of the feed water. The produced vapor then condenses into a potable liquid in the heat exchanger of the second stages 1256. The heat of condensation evaporates more water in that effect. The brine from the first effects 1254a-c is then purged. At the second stages 1256, the evaporated water goes on to power the third stages 1256 with the resulting brine being drained from the bottom of the stages 1256. This process continues to the last effects 1258a-c within each train 1252a-c. In each last effect 1258a-c, the corresponding produced vapor entering the condenser effects 1258a-c is condensed by the incoming saline water, which acts as a coolant. Part of the preheated saline water is then sent to the various effects as a feed water. In this example implementation, the saline water temperature is 28° C. and the feed water temperature is about 35° C. The temperature drop from effect to effect in this example is about 3° C. As shown in this implementation of the MED system 1250, the third train 1252c has four effects, the second train 1252b has three effects, and the first train 1252a has two effects. These three trains 1252a-c can be implemented in any plant on phases to satisfy a plant's capital availability. Each train 1252a-c uses the same amount of energy/waste heat with decreasing energy quality such as about 73 MW of waste heat.

The heating fluid circuits 1202 and 1260 that flow the heating fluids 1204 and 1262 through the seventeen heat exchangers can include multiple valves that can be operated manually or automatically. For example, the NGL fractionation plant can be fitted with the heating fluid flow pipes and valves. An operator can manually open each valve in the circuit to cause the heating fluids 1204 and 1262 to flow through the circuits 1202 and 1260, respectively. To cease waste heat recovery, for example, to perform repair or maintenance or for other reasons, the operator can manually close each valve in the circuits 1202 and 1260. Alternatively, a control system, for example, a computer-controlled control system, can be connected to each valve in the circuits 1202 and 1260. The control system can automatically control the valves based, for example, on feedback from sensors (for example, temperature, pressure or other sensors), installed at different locations in the circuits 1202 and 1260. The control system can also be operated by an operator.

In the manner described earlier, the heating fluids 1204 and 1262 can be looped through the seventeen heat exchangers to recover heat that would otherwise go to waste in the NGL fractionation plant, and to use the recovered waste heat to operate the MRTC compressor-turbine-ejector system 1210 and the MED system 1250. By doing so, an amount of energy needed to operate the MRTC compressor-turbine-ejector system 1210 can be decreased while obtaining the same or substantially similar power output from the MRTC compressor-turbine-ejector system 1210. For example, the power output from the MRTC compressor-turbine-ejector system 1210 that implements the waste heat recovery network can be greater than or lower than the power output from a power generation system that does not implement the waste heat recovery network. Where the power output is less, the difference may not be statistically significant. Consequently, a power generation efficiency of the NGL fractionation plant can be increased.

As shown in FIGS. 1B-1C, the heating fluids 1204 and 1262 are pumped, at about 120° F., from the tank 1206 by the pump 1208. In some implementations, the first heating fluid 1204 and 1262 are divided from a common source and directed towards specific units in the NGL fractionation plant to recover specific amounts of thermal energy. The thermal energy absorbed from the NGL fractionation plant increases the second heating fluid 1262 from about 120° F. to about 136° F. The second heating fluid 1262 at 136° F. is then used to drive the MED system 130, as previously described, to produce desalinated water from a feed water (for example, a brackish water stream or sea water stream) at the rate of about 23,000 m3/day. The temperature of the second heating fluid 1262 is reduced in the MED system 1250 to its original value of 120° F. and this stream flows back to the tank 1206.

As shown in FIG. 1B, the thermal energy absorbed from the NGL fractionation plant also increases the temperature of the first heating fluid 1204 from about 120° F. to about 176° F. The first heating fluid 1204 stream at 136° F. is then used to drive the MRTC compressor-turbine-ejector system 1210 to produce about 28 MW of power. The temperature of the first heating fluid 1204 is reduced in the MRTC compressor-turbine-ejector system 1210 to its original value of 120° F. and this stream flows back to the tank 1206.

FIG. 1D shows the first heat exchanger 1202a in a propane dehydration section of the NGL fractionation plant. In this example, the heat exchanger 1202a is positioned and thermally coupled to a heat source to recover waste heat from the propane dehydrator. The first heating fluid 1204 is circulated from the tank 1206 at 120° F. to heat exchanger 1202a to cool down the outlet stream of the propane dehydrator. The first heating fluid 1204 is heated in the heat exchanger 1202a to between about 390° F. and 400° F., for example, about 395° F. before it flows to a collection header to join other heating fluid streams 1204 from other parts of the NGL fractionation plant to flow to the heat exchanger 1216 of the MRTC compressor-turbine-ejector system 1210. The total thermal duty of the heat exchanger 1202a is about 96 MM BTU/H.

FIG. 1E shows the first heat exchanger 1260a in a depropanizer section of the NGL fractionation plant. In this example, the heat exchanger 1260a is positioned and thermally coupled to a heat source to recover waste heat from the depropanizer overhead stream. The second heating fluid 1262 is circulated from the storage tank 1206 at 120° F. to heat exchanger 1260a to cool down the outlet stream of the depropanizer overhead stream. The second heating fluid 1262 is heated in the heat exchanger 1260a to between about 131° F. and 141° F., for example, about 136° F. before it is circulated to the collection header to join other heating fluid streams 1262 from other parts of the NGL fractionation plant to flow to the inlet heat exchanger 1254c of the MED system 1250. The total thermal duty of the heat exchanger 1260a is about 951 MM BTU/H.

FIG. 1F the second heat exchanger 1202b in a butane dehydration section of the NGL fractionation plant. In this example, the heat exchanger 1202b is positioned and thermally coupled to a heat source to recover waste heat from the butane dehydrator. The first heating fluid 1204 is circulated from the storage tank 1206 at 120° F. to heat exchanger 1202b to cool down the outlet stream of the butane dehydrator. The first heating fluid 1204 is heated in the heat exchanger 1202b to between about 391° F. and 401° F., for example, about 395° F. before it is circulated to the heat exchanger 1216 of the MRTC compressor-turbine-ejector system 1210. The total thermal duty of the heat exchanger 1202b is about 47 MM BTU/H.

FIG. 1G shows the third and fourth heat exchangers 1202c and 1202d, respectively, as well as the second heat exchanger 1260b, in a debutanizer section of the NGL fractionation plant. In this example, the heat exchanger 1202c is positioned and thermally coupled to a heat source to recover waste heat from the debutanizer overhead stream. The first heating fluid 1204 is circulated from the storage tank 1206 at 120° F. to heat exchanger 1202c to cool down the second portion of the outlet stream of the debutanizer overhead stream. The first heating fluid 1204 is heated in the heat exchanger 1202c to between about 147° F. and 157° F., for example, about 152° F. before it is circulated to the collection header to join other heating fluid streams 1204 from other parts of the NGL fractionation plant to flow to the heat exchanger 1216 of the MRTC compressor-turbine-ejector system 1210. The total thermal duty of the heat exchanger 1202c is about 518 MM BTU/H.

In this example, the heat exchanger 1202d is positioned and thermally coupled to a heat source to recover waste heat from the debutanizer bottoms. The first heating fluid 1204 is circulated from the storage tank 1206 at 120° F. to heat exchanger 1202d cool down the outlet stream of the debutanizer bottoms. The first heating fluid 1204 is heated in the heat exchanger 1202d to between about 256° F. and 266° F., for example, about 261° F. before it is circulated to the collection header to join other heating fluid streams 1204 from other parts of the NGL fractionation plant to flow to the heat exchanger 1216 of the MRTC compressor-turbine-ejector system 1210. The total thermal duty of the heat exchanger 1202d is about 4567 MM BTU/H.

In this example, the heat exchanger 1260b is positioned and thermally coupled to a heat source to recover waste heat from the debutanizer overhead stream. The second heating fluid 1262 is circulated from the storage tank 1206 at 120° F. to heat exchanger 1260b to cool down the first portion of the outlet stream of the debutanizer overhead stream. The second heating fluid 1262 is heated in the heat exchanger 1260b to between about 147° F. and 157° F., for example, about 152° F. before it is circulated to the collection header to join other heating fluid streams 1262 from other parts of the NGL fractionation plant to flow to the inlet heat exchanger 1254c of the MED system 1250. The total thermal duty of the heat exchanger 1260b is about 69 MINI BTU/H.

FIG. 1H shows the fifth heat exchanger 1202e in a depentanizer section of the NGL fractionation plant. In this example, the heat exchanger 1202e is positioned and thermally coupled to recover waste heat from the depentanizer overhead stream. The first heating fluid 1204 is circulated from the storage tank 1206 at 120° F. to heat exchanger 1202e to cool down the outlet stream of the depentanizer overhead stream. The first heating fluid 1204 is heated in the heat exchanger 1202e to between about 160° F. and 170° F., for example, about 165° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202e is about 100 MM BTU/H.

FIG. 1I shows the sixth heat exchanger 1202f and seventh heat exchanger 1202g in an ADIP regeneration section of the NGL fractionation plant. In this example, the heat exchanger 1202f is positioned and thermally coupled to a heat source to recover waste heat from the ADIP regeneration section overhead stream. The first heating fluid 1204 is circulated from the storage tank 1206 at 120° F. to heat exchanger 1202f to cool down the outlet stream of the ADIP regeneration section overhead stream. The first heating fluid 1204 is heated in the heat exchanger 1202f to between about 222° F. and 232° F., for example, about 227° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202f is about 18 MM BTU/H.

Another branch of the first heating fluid 1204 is circulated from the storage tank 1206 at 120° F. to the heat exchanger 1202g that positioned and thermally coupled to a heat source to recover waste heat from the ADIP regeneration section bottoms. The first heating fluid 1204 is circulated from the storage tank 1206 at 120° F. to heat exchanger 1202g to cool down the outlet stream of the ADIP regeneration section bottoms. The first heating fluid 1204 is heated in the heat exchanger 1202g to between about 166° F. and 176° F., for example, about 171° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202g is about 219 MM BTU/H.

FIG. 1J shows the eighth heat exchanger 1202h and the ninth heat exchanger 1202i in a natural gasoline decolorizing section of the NGL fractionation plant. In this example, the heat exchangers 1202h and 1202i are positioned and thermally coupled to respective heat sources to recover waste heat from the natural gasoline decolorizing section. The first heating fluid 1204 is circulated from the storage tank 1206 at 120° F. to heat exchanger 1202h to cool down the outlet stream of the natural gasoline decolorizing section pre-flash drum overhead stream. The first heating fluid 1204 is heated in the heat exchanger 1202h to between about 206° F. and 216° F., for example, about 211° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202h is about 107 MM BTU/H.

Another branch of the first heating fluid 1204 is circulated from the storage tank 1206 at 120° F. to heat exchanger 1202i to cool down the outlet stream of the natural gasoline decolorizer overhead stream. The first heating fluid 1204 is heated in the heat exchanger 1202i to between about 224° F. and 234° F., for example, about 229° F. before it is circulated to the collection header to join the other heating fluid streams 1204 from other parts of the NGL fractionation plant then directed to flow to the heat exchanger 1216 of the MRTC compressor-turbine-ejector system 1210. The total thermal duty of the heat exchanger 1202i is about 53 MM BTU/H.

FIG. 1K shows the tenth heat exchanger 1202j in a propane tank vapor recovery section of the NGL fractionation plant. In this example, the heat exchanger 1202j is positioned and thermally coupled to recover waste heat from the propane vapor recovery compressor stream. The first heating fluid 1204 is circulated from the storage tank 1206 at 120° F. to heat exchanger 1202j to cool down the outlet stream of the propane vapor recovery compressor stream. The first heating fluid 1204 is heated in the heat exchanger 1202j to between about 257° F. and 267° F., for example, about 263° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202j is about 29 MM BTU/H.

FIG. 1L shows the eleventh heat exchanger 1202k in a propane product refrigeration section of the NGL fractionation plant. In this example, the heat exchanger 1202k is positioned and thermally coupled to recover waste heat from the propane refrigeration compressor stream. The first heating fluid 1204 is circulated from the storage tank 1206 at 120° F. to heat exchanger 1202k to cool down the outlet stream of the propane refrigeration compressor stream. The first heating fluid 1204 is heated in the heat exchanger 1202k to between about 187° F. and 197° F., for example, about 192° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202k is about 81 MM BTU/H.

FIG. 1M shows the twelfth heat exchanger 12021 in a propane product sub-cooling section of the NGL fractionation plant. In this example, the heat exchanger 12021 is positioned and thermally coupled to a heat source to recover waste heat from the propane main compressor stream. The first heating fluid 1204 is circulated from the storage tank 1206 at 120° F. to heat exchanger 12021 to cool down the outlet stream of the propane main compressor stream. The first heating fluid 1204 is heated in the heat exchanger 12021 to between 232° F. and 242° F., for example, about 237° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 12021 is about 65 MM BTU/H.

FIG. 1N shows the thirteenth heat exchanger 1202m in a butane product refrigeration section of the NGL fractionation plant. In this example, the heat exchanger 1202m is positioned and thermally coupled to a heat source to recover waste heat from the butane refrigeration compressor stream. The first heating fluid 1204 is circulated from the storage tank 1206 at 120° F. to heat exchanger 1202*m* to cool down the outlet stream of the butane refrigeration compressor stream. The first heating fluid 1204 is heated in the heat exchanger 1202*m* to between about 142° F. and 152° F., for example, about 147° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202*m* is about 49 MM BTU/H.

FIG. 1O shows the fourteenth heat exchanger 1202*n* in an ethane production section of the NGL fractionation plant. In this example, the heat exchanger 1202*n* is positioned and thermally coupled to a heat source to recover waste heat from the ethane dryer. The first heating fluid 1204 is circulated from the storage tank 1206 at 120° F. to heat exchanger 1202*n* to cool down the outlet stream of the ethane dryer during the generation mode. The first heating fluid 1204 is heated to between about 405° F. and 415° F., for example, about 410° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202*n* is about 22 MM BTU/H.

FIG. 1P shows the fifteenth heat exchanger 1202*o* in a natural gasoline vapor pressure control section of the NGL fractionation plant. In this example, the heat exchanger 1202*o* is positioned and thermally coupled to a heat source to recover waste heat from the Reid vapor pressure control column. The first heating fluid 1204 is circulated from the storage tank 1206 at 120° F. to heat exchanger 1202*o* to cool down the outlet stream of the Reid vapor pressure control column overhead stream. The first heating fluid 1204 is heated in the heat exchanger 1202*o* to between about 206° F. and 216° F., for example, about 211° F. before it is circulated to the collection header to join other heating fluid streams 1204 from other parts of the NGL fractionation plant then directed to flow to the heat exchanger 1216 of the MRTC compressor-turbine-ejector system 1210. The total thermal duty of the heat exchanger 1202*o* is about 36 MM BTU/H.

FIGS. 1A-1P illustrate schematic views of an example system 1200 for a power conversion, cooling, and potable water network that includes waste heat sources associated with a NGL fractionation plant. In this example system 1200, a mono-refrigerant triple vapor compressor-expander-ejector cycle uses propane liquid at two identified operating pressures to serve the mechanical compression refrigeration cycle waste heat recovery and the rest of NGL fractionation plant waste heat recovery, then converts the waste heat in an organic Rankine cycle (ORC) to generate about 26.4 MW of power, and also enable the ejector refrigeration cycle to support the compressor outlet stream via its sub-cooling, using a heat exchanger with a thermal duty of about 62.9 MMBTU/h to reduce a main refrigeration cycle compressor power consumption for the NGL fractionation plant by about 10 MW (that is, by about 21% of the refrigeration package power consumption). The system 1200 also includes a system for waste heat to water conversion using a multi-effect distillation (MED) system to produce about 32,000 m³/day. The MED system in the example of system 1200 consists of three trains in series. Such trains can be independent and installed on stages/phases. Each train can consists of several trains of the exact same design in parallel.

In some aspects, the system 1200 can be implemented in one or more steps, where each phase can be separately implemented without hindering future steps to implement the system 1200. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 1200, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the whole crude oil refining-petrochemical complex utilized in an initial phase.

The techniques to recover heat energy generated by a petrochemical refining system described above can be implemented in at least one or both of two example scenarios. In the first scenario, the techniques can be implemented in a petrochemical refining system that is to be constructed. For example, a geographic layout to arrange multiple sub-units of a petrochemical refining system can be identified. The geographic layout can include multiple sub-unit locations at which respective sub-units are to be positioned. Identifying the geographic layout can include actively determining or calculating the location of each sub-unit in the petrochemical refining system based on particular technical data, for example, a flow of petrochemicals through the sub-units starting from crude petroleum and resulting in refined petroleum. Identifying the geographic layout can alternatively or in addition include selecting a layout from among multiple previously-generated geographic layouts. A first subset of sub-units of the petrochemical refining system can be identified. The first subset can include at least two (or more than two) heat-generating sub-units from which heat energy is recoverable to generate electrical power. In the geographic layout, a second subset of the multiple sub-unit locations can be identified. The second subset includes at least two sub-unit locations at which the respective sub-units in the first subset are to be positioned. A power generation system to recover heat energy from the sub-units in the first subset is identified. The power generation system can be substantially similar to the power generation system described earlier. In the geographic layout, a power generation system location can be identified to position the power generation system. At the identified power generation system location, a heat energy recovery efficiency is greater than a heat energy recovery efficiency at other locations in the geographic layout. The petrochemical refining system planners and constructors can perform modeling or computer-based simulation experiments, or both, to identify an optimal location for the power generation system to maximize heat energy recovery efficiency, for example, by minimizing heat loss when transmitting recovered heat energy from the at least two heat-generating sub-units to the power generation system. The petrochemical refining system can be constructed according to the geographic layout by positioning the multiple sub-units at the multiple sub-unit locations, positioning the power generation system at the power generation system location, interconnecting the multiple sub-units with each other such that the interconnected multiple sub-units are configured to refine petrochemicals, and interconnecting the power generation system with the sub-units in the first subset such that the power generation system is configured to recover heat energy from the sub-units in the first subset and to provide the recovered heat energy to the power generation system. The power generation system is configured to generate power using the recovered heat energy.

In the second scenario, the techniques can be implemented in an operational petrochemical refining system. In other words, the power generation system described earlier can be retrofitted to an already constructed and operational petrochemical refining system.

In summary, this disclosure describes configurations and related processing schemes of mini-power plants synthesized for grassroots medium grade crude oil semi-conversion refineries to generate power from specific portions of low grade waste heat sources. The disclosure also describes configurations and related processing schemes of mini-power plants synthesized for integrated medium grade crude oil semi-conversion refineries and aromatics complex for power generation from specific portions of low grade waste sources.

The economics of industrial production, the limitations of global energy supply, and the realities of environmental conservation are concerns for all industries. It is believed that the world's environment has been negatively affected by global warming caused, in part, by the release of GHG into the atmosphere. Implementations of the subject matter described here can alleviate some of these concerns, and, in some cases, prevent certain refineries, which are having difficulty in reducing their GHG emissions, from having to shut down. By implementing the techniques described here, specific plants in a refinery or a refinery, as a whole, can be made more efficient and less polluting by carbon-free power generation from specific portions of low grade waste heat sources.

Thus, particular implementations of the subject matter have been described. Other implementations are within the scope of the following claims.

What is claimed is:

1. A system, comprising:
   a heating fluid circuit configured to thermally couple a heating fluid to a plurality of heat sources of a hydrocarbon refining plant, the heating fluid circuit comprising a plurality of heat exchangers fluidly coupled in parallel;
   an integrated triple cycle system thermally coupled to the heating fluid circuit through a first heat exchanger, the integrated triple cycle system comprising:
      a power cycle that comprises a first working fluid that is thermally coupled to the heating fluid circuit in the first heat exchanger to heat the first working fluid, and a first expander configured to generate electrical power from the heated first working fluid;
      a refrigeration cycle that thermally couples a second working fluid to a first portion of the first working fluid in a second heat exchanger that comprises a refrigeration cycle condenser, the refrigeration cycle configured to generate an amount of cooling power with the second working fluid in a refrigeration cycle compressor; and
      an ejector refrigeration cycle that fluidly couples the first portion of the first working fluid with a second portion of the first working fluid in an ejector of the ejector refrigeration cycle and is configured to reduce a compression power of the refrigeration cycle compressor, the second portion of the first working fluid thermally coupled to the second working fluid in a sub-cooler of the refrigeration cycle; and
   a flow control system that comprises a first set of control valves to selectively thermally couple the first heating fluid to a portion of the plurality of heat sources of the hydrocarbon refining plant, the flow control system further comprising a second set of control valves to selectively thermally couple the second heating fluid to another portion of the plurality of heat sources of the hydrocarbon refining plant.

2. The system of claim 1, further comprising conduits containing the working fluid and the working fluid comprises isobutane, and the heating fluid circuit further comprises pipes containing water or oil.

3. The system of claim 1, wherein the power cycle further comprises:
   a heating fluid tank that is fluidly coupled to the first heat exchanger;
   a condenser fluidly coupled to the expander, to the ejector, and to a condenser fluid source to cool the working fluid; and
   a pump to circulate the working fluid through the first heat exchanger.

4. The system of claim 1, wherein the refrigeration cycle further comprises an evaporator thermally coupled to the working fluid to heat a second portion of the working fluid, where at least part of the second portion of the working fluid is fluidly coupled with the first portion of the working fluid and circulated to the expander, and the sub-cooler is thermally coupled to the working fluid to heat a third portion of the working fluid.

5. The system of claim 4, wherein another part of the second portion of the working fluid and the third portion of the working fluid are fluidly coupled to the ejector, and
   the ejector is configured to vaporize the third portion of the working fluid with heat from the another part of the second portion of the working fluid to produce a vaporized working fluid.

6. The system of claim 1, wherein the plurality of heat exchangers comprises a plurality of plate and frame heat exchangers.

7. The system of claim 6, wherein the plurality of heat exchangers comprises a plurality of sets of heat exchangers, each set of heat exchangers comprising between one and four heat exchangers.

8. The system of claim 7, wherein the plurality of sets of heat exchangers comprise:
   a first set of heat exchangers comprising one heat exchanger;
   a second set of heat exchangers comprising four heat exchangers;
   a third set of heat exchangers comprising four heat exchangers;
   a fourth set of heat exchangers comprising one heat exchanger;
   a fifth set of heat exchangers comprising three heat exchangers;
   a sixth set of heat exchangers comprising two heat exchangers; and
   a seventh set of heat exchangers comprising one heat exchanger.

9. The system of claim 8, wherein the one heat exchanger of the first set of heat exchangers is thermally coupled to at least one ethane system heat source, the four heat exchangers of the second set of heat exchangers are thermally coupled to at least four propane system heat sources, the four heat exchangers of the third set of heat exchangers are thermally coupled to at least four butane system heat sources, the one heat exchanger of the fourth set of heat exchangers is thermally coupled to at least one pentane system heat source, the three heat exchangers of the fifth set of heat exchangers are thermally coupled to at least three natural gasoline system heat sources, the two heat exchangers of the sixth set of heat exchangers are thermally coupled to at least two solvent regeneration system heat sources, and the one heat exchanger of the seventh set of heat exchangers is thermally coupled to at least one propane system heat source.

10. The system of claim 1, wherein the hydrocarbon refining plant comprises a natural gas liquid (NGL) fractionation plant.

11. A method, comprising:
circulating a heating fluid in a heating fluid circuit that comprises a plurality of heat exchangers fluidly coupled in parallel;
thermally coupling the heating fluid to a plurality of heat sources of a hydrocarbon refining plant in the plurality of heat exchangers;
thermally coupling an integrated triple cycle system to the heating fluid circuit through a first heat exchanger, the thermally coupling comprising:
 thermally coupling a first working fluid of a power cycle to the heating fluid circuit in the first heat exchanger to heat the first working fluid,
 generating electrical power with a first expander of the power cycle from the heated first working fluid,
 thermally coupling a second working fluid to a first portion of the first working fluid in a second heat exchanger of a refrigeration cycle that that comprises a refrigeration cycle condenser,
 generating an amount of cooling power with the second working fluid in a refrigeration cycle compressor of the refrigeration cycle,
 fluidly coupling the first portion of the first working fluid with a second portion of the first working fluid in an ejector of an ejector refrigeration cycle,
 reducing a compression power of a refrigeration cycle compressor of the ejection refrigeration cycle, and
 thermally coupling the second portion of the first working fluid to the second working fluid in a sub-cooler of the refrigeration cycle;
actuating, with a flow control system, a first set of control valves to selectively thermally couple the first heating fluid to a portion of the plurality of heat sources of the hydrocarbon refining plant; and
actuating, with the flow control system, a second set of control valves to selectively thermally couple the second heating fluid to another portion of the plurality of heat sources of the hydrocarbon refining plant.

12. The method of claim 11, further comprising:
circulating the working fluid through conduits that contain the working fluid, where the working fluid comprises isobutane; and
circulating the heating fluid through pipes of the heating fluid circuit, where the heating fluid comprises water or oil.

13. The method of claim 11, further comprising:
circulating the heating fluid to a heating fluid tank that is fluidly coupled to the first heat exchanger; and
circulating a condenser fluid supply liquid to a condenser fluidly coupled to the expander, from a condenser fluid source to cool the first working fluid.

14. The method of claim 11, wherein the refrigeration cycle further comprises an evaporator thermally coupled to the working fluid to heat a second portion of the working fluid, where at least part of the second portion of the working fluid is fluidly coupled with the first portion of the working fluid and circulated to the expander, and the sub-cooler is thermally coupled to the working fluid to heat a third portion of the working fluid.

15. The method of claim 14, wherein another part of the second portion of the working fluid and the third portion of the working fluid are fluidly coupled to the ejector, and
the ejector is configured to vaporize the third portion of the working fluid with heat from the another part of the second portion of the working fluid to produce a vaporized working fluid.

16. The method of claim 11, wherein the plurality of heat exchangers comprises a plurality of plate and frame heat exchangers.

17. The method of claim 16, wherein the plurality of heat exchangers comprises a plurality of sets of heat exchangers, each set of heat exchangers comprising between one and four heat exchangers.

18. The method of claim 17, wherein the plurality of sets of heat exchangers comprise:
a first set of heat exchangers comprising one heat exchanger;
a second set of heat exchangers comprising four heat exchangers;
a third set of heat exchangers comprising four heat exchangers;
a fourth set of heat exchangers comprising one heat exchanger;
a fifth set of heat exchangers comprising three heat exchangers;
a sixth set of heat exchangers comprising two heat exchangers; and
a seventh set of heat exchangers comprising one heat exchanger.

19. The method of claim 18, wherein the one heat exchanger of the first set of heat exchangers is thermally coupled to at least one ethane system heat source, the four heat exchangers of the second set of heat exchangers are thermally coupled to at least four propane system heat sources, the four heat exchangers of the third set of heat exchangers are thermally coupled to at least four butane system heat sources, the one heat exchanger of the fourth set of heat exchangers is thermally coupled to at least one pentane system heat source, the three heat exchangers of the fifth set of heat exchangers are thermally coupled to at least three natural gasoline system heat sources, the two heat exchangers of the sixth set of heat exchangers are thermally coupled to at least two solvent regeneration system heat sources, and the one heat exchanger of the seventh set of heat exchangers is thermally coupled to at least one propane system heat source.

20. The method of claim 11, wherein the hydrocarbon refining plant comprises a natural gas liquid (NGL) fractionation plant].

* * * * *